(12) United States Patent
Canning

(10) Patent No.: US 7,945,430 B2
(45) Date of Patent: *May 17, 2011

(54) COMPRESSION AND COMPRESSED INVERSION OF INTERACTION DATA

(76) Inventor: Francis X. Canning, Morgantown, WV (US)

( * ) Notice: Subject to any disclaimer, the term of this patent is extended or adjusted under 35 U.S.C. 154(b) by 678 days.

This patent is subject to a terminal disclaimer.

(21) Appl. No.: 11/924,526

(22) Filed: Oct. 25, 2007

(65) Prior Publication Data

US 2008/0091392 A1  Apr. 17, 2008

Related U.S. Application Data

(63) Continuation-in-part of application No. 09/676,727, filed on Sep. 29, 2000, now Pat. No. 7,742,900.

(51) Int. Cl.
*G06F 17/10* (2006.01)
(52) U.S. Cl. ............................................... 703/2; 703/13
(58) Field of Classification Search .................. 703/1, 2, 703/5, 13
See application file for complete search history.

(56) References Cited

U.S. PATENT DOCUMENTS

| | | | |
|---|---|---|---|
| 5,548,798 A | 8/1996 | King | |
| 5,615,288 A | 3/1997 | Koshi et al. | |
| 5,867,416 A | 2/1999 | Feldmann et al. | |
| 6,051,027 A | 4/2000 | Kapur et al. | |
| 6,064,808 A | 5/2000 | Kapur et al. | |
| 6,182,270 B1 | 1/2001 | Feldmann et al. | |
| 6,295,513 B1 | 9/2001 | Thackston | |
| 6,353,801 B1 | 3/2002 | Sercu et al. | |
| 6,363,338 B1 | 3/2002 | Ubale et al. | |
| 6,675,137 B1 | 1/2004 | Toprac et al. | |
| 2004/0010400 A1 | 1/2004 | Canning | |
| 2004/0078174 A1 | 4/2004 | Canning | |
| 2005/0234686 A1 | 10/2005 | Cheng et al. | |
| 2006/0195306 A1 | 8/2006 | Canning | |
| 2006/0265200 A1 | 11/2006 | Canning | |
| 2008/0046225 A1 | 2/2008 | Canning | |
| 2008/0065361 A1 | 3/2008 | Canning | |
| 2008/0091391 A1 | 4/2008 | Canning | |
| 2008/0097730 A1 | 4/2008 | Canning | |

OTHER PUBLICATIONS

Office Action dated Oct. 8, 2008 from Related U.S. Appl. No. 10/619,796.
Office Action dated Sep. 29, 2008 from Related U.S. Appl. No. 11/417,429.
Amaratunga, Kevin, "A Wavelet-Based Approach for Compressing Kernal Data in Large-Scale Simulations of 3D Integral Problems," Computing in Science & Engineering, Jul./Aug. 2000, pp. 35-45.

(Continued)

*Primary Examiner* — Kamini S Shah
*Assistant Examiner* — Herng-Der Day
(74) *Attorney, Agent, or Firm* — Knobbe, Martens, Olson & Bear, LLP

(57) ABSTRACT

A compression technique compresses interaction data. A fast method processes the compressed data without the need to first decompress the data. In one embodiment, the compression technique is used to compress data in an interaction matrix. The interaction matrix (such as a moment method impedance matrix) contains interaction data between sources (e.g., basis functions or expansion functions) and testers (e.g., testing functions). The sources are collected into groups of sources according to specified criteria. One useful criteria is based on grouping sources relatively close to one another. For each group of sources, a composite source is calculated. The testers are also collected into groups and composite testers are calculated. The use of composite sources and composite testers to compute couplings when the source and tester are not close to each other allows the interaction matrix to be computed as a sparse matrix with a block format.

32 Claims, 14 Drawing Sheets

OTHER PUBLICATIONS

Anderson, Soren, "On Optimal Dimension Reduction for Sensor Array Signal Processing," Signal Processing, Jan. 1993, pp. 245-256.

Boag et al., "Complex Multipole Beam Approach to Electromagnetic Scattering Problems," IEEE Transactions on Antennas and Propagation, vol. 42, No. 3, Mar. 1994.

Borgiotti et al., "The Determination of the Far Field of an Acoustic Radiator From Sparse Measurement Samples in the Near Field," Journal of the Acoustical Society of America, vol. 92, Aug. 1992.

Bornholdt et al., "Mixed-Domain Galerkin Expansions in Scattering Problems," IEEE Transactions on Antennas and Propagation, vol. 36, No. 2, Feb. 1988, pp. 216-227.

Brandt et al., "Multilevel Matrix Multiplication and Fast Solution of Integral Equations," Journal of Computational Physics, 1990, pp. 348-370.

Bucci et al., "On the Degrees of Freedom of Scattered Fields," IEEE Transactions on Antennas and Propagation, vol. 37, No. 7, Jul. 1989.

Canning, Francis X., "A Fast Moment Method Matrix Solver," $14^{th}$ Annual Review of Progress in Applied Computational Electromagnetics, Mar. 1998, pp. 449-454.

Canning, Francis X., "A Sparse Approximate Inverse to the IML Matrices Allows Solution in Five Iterations," 1992, IEEE.

Canning, Francis X., "Fast Direct Solution of Standard Moment-Method Matrices," IEEE Antennas & Propagation, vol. 40, No. 3, Jun. 1998, pp. 15-26.

Canning, Francis X., "Fast Sparse Decomposition of Standard Moment Method Matrices," 1997 North American Radio Science Meeting, Program and Abstracts, Jul. 1997, pp. 68-69.

Canning, Francis X., "Improved Impedance Matrix Localization Method," IEEE Transactions on Antennas and Propagation, vol. 41, No. 5, May 1993, pp. 659-667.

Canning, Francis X., "Reducing Moment Method Storage from Order N2 to Order N," Electronics Letters, vol. 25, No. 19, Sep. 1989, pp. 1274-1275.

Canning, Francis X., "Solution of Impedance Matrix Localization Form of Moment and Method Problems in Five Iterations," Radio Science, vol. 30, No. 5, Sep./Oct. 1995, pp. 1371-1384.

Canning, Francis X., "The Impedance Matrix Localization (IML) Method for Moment-Method Calculations," IEEE Antennas and Propagation Magazine, vol. 23, No. 5, Oct. 1990, pp. 18-30.

Chew et al., "Fast Solution Methods in Electromagnetics," Mar. 1997, IEEE Transactions on Antennas and Propagation, vol. 45, No. 3, pp. 533-543.

Coifman et al., "The Fast Multipole Method for the Wave Equation: A Pedestrian Prescription," IEEE Antennas and Propagation Magazine, vol. 35, No. 3, Jun. 1993, pp. 7-12.

Deng et al., "Fast Solution of Electromagnetic Integral Equations Using Adaptive Wavelet Packet Transform," IEEE Transactions on Antennas and Propagation, vol. 47, No. 4, Apr. 1999.

Fourie et al., "A Fast Sparse Iterative Method (SIM) for Method of Moment," 1994; IEEE.

Gothard et al., "A New Technique to Generate Sparse Matrix Using the Method of Moments—Applications to Two-Dimensional Problems," Presented at the URSI Meeting, Jun. 1995, Newport Beach, California, p. 302 of the meeting digest.

Greengard et al., "A Fast Algorithm for Particle Simulations," Journal of Computational Physics, vol. 73, No. 2, Dec. 1987, pp. 325-348.

Hermann, Gabriel F., "Note on Interpolational Basis Functions in the Method of Moments," IEEE Transactions on Antennas and Propagation, vol. 38, No. 1, Jan. 1990, pp. 134-137.

Kapur et al., Efficient Electrostatic and Electromagnetic Simulation Using IES3, IEEE Journal on Comp. Eng., Dec. 1998.

Kapur et al., "Efficient Full-Wave Simulation in Layered, Lossy Media," Custom Integrated Circuits Conference, May 11-14, 1998.

Kapur et al., "Efficient Three-Dimensional Extraction Based on Static and Full-Wave Layered Green's Functions," Design Automation Conference, Jun. 16, 1998.

Kapur et al., "High-Order Nyström Schemes for Efficient 3-D Capacitance Extraction," International Conference on Computer-Aided Design, Nov. 8-12, 1998.

Kapur et al., "IES3: A Fast Integral Equation Solver for Efficient 3-Dimensional Extraction," International Conference on Computer-Aided Design, Nov. 9-13, 1997.

Kevorkian et al., "Sparse Complete Orthogonal Factorization as Applied to Bistatic Target Strength Prediction," DOD High Performance Computing $7^{th}$ Users Group Conference, Jun. 26, 1997.

Liu et al., "Scattering of 2-D Conducting Concave Object by MoM Matrix Decomposition Technique," Microwave and Optical Technology Letters, vol. 25, No. 2, Apr. 20, 2000.

Michielssen et al., "A Multilevel Matrix Decomposition Algorithm for Analyzing Scattering from Large Structures," IEEE, vol. 44, No. 8, Aug. 1996, pp. 1086-1093.

Michielssen et al., "Multilevel Evaluation of Electromagnetic Fields for the Rapid Solution of Scattering Problems," Microwave and Optical Technology Letters, vol. 7, No. 17, Dec. 1994, pp. 790-795.

Michielssen et al., "Reduced Representation of Matrices Generated by the Method of Moments," IEEE, vol. 1, No. 94CH3466-0, Jun. 1994, pp. 419-423.

Nitch et al., "A Redesign of NEC2 Using Object-Oriented Paradigm," 1994, IEEE.

Nitch et al., "Investigating Three Methods for Improving the Performance of the SIM Algorithm," 1994; IEEE.

Photiadis, Douglas M., "The Relationship of Singular Value Decomposition to Wave-Vector Filtering in Sound Radiation Problems," J. Acoust. Soc. Am. 88(2), Aug. 1990, pp. 1152-1159.

Porgorzelski, Ronald J., "Improved Computational Efficiency via Near-Field Localization," IEEE Transactions on Antennas and Propagation, vol. 41, No. 8, Aug. 1993, pp. 1081-1087.

Rius et al., "The Multilevel Matrix Decomposition Algorithm in 3-D," Proceedings of the International Conference on Electromagnetics in Advanced Applications, Sep. 1999, pp. 728-732.

Rakhlin, Vladimir, "Diagonal Forms of Translation for the Helmholtz Equation in Three Dimensions," Research Report YALEU/DCS/44-894, Mar. 1992.

Rokhlin et al., "Generalized Gaussian Quadratures and Singular Value Decompositions of Integral Operators," Research Report YALEU/DCS/RR-1109, May 1996.

Rokhlin, Vladimir, "Sparse Diagonal Forms for Translation Operators for Helmholtz Equation in Two Dimensions," Research Report YALEU/DCS/RR-1095, Dec. 1995.

Schenck et al., "A Hybrid Method for Predicting the Complete Scattering Function From Limited Data," J. Acoust. Am. 98(6), Dec. 1995, pp. 3469-3481.

Wagner, Robert L., "A Ray-Propagation Fast Multipole Algorithm," Microwave and Optical Technology Letter, vol. 7, No. 10, Jul. 1994, pp. 435-438.

West et al., "On Iterative Approaches for Electromagnetic Rough-Surface Scattering Problems," Aug. 1999, IEEE Transactions on Antennas and Propagation, vol. 47, No. 8.

Massachusetts Institute of Technology, "The Method of Moments in Electromagnetics 6.635 lecture notes", Jan. 2004, pp. 1-6.

Mobile/Cellular Technology website, http://www.mobilecomms-technology.com/contractors/antennas/poynting/press2.html, Oct. 2003.

Rao et al., "A New Technique to Generate a Sparse Matrix Using the Method of Moments for Electromagnetic Scattering Problems," Microwave and Optical Technology Letters, vol. 19, No. 4, Nov. 1998.

Rao et al., "A New Technique to Generate Sparse Matrix Using the Method of Moments—Wire Scattering Problems," Presented at the URSI Meeting, Jun. 1995, Newport Beach, California, p. 303 of the meeting digest.

Rao et al., "Generation of Adaptive Basis Functions to Create a Sparse Impedance Matrix Using Methods of Moments," Presented at the URSI Meeting, Jul. 20, 2000, Salt Lake City, Utah, p. 354 of the meeting digest.

"SuperNEC: Getting Started," Version 1.53, Poynting Software (Pty) Ltd., Sep. 3, 2001, in 27 pages.

"SuperNEC: GUI Input User Reference Manual," Version 1.5, Poynting Software (Pty) Ltd., May 11, 2001, in 108 pages.

"SuperNEC: GUI Output User Reference Manual," Version 2.0, Poynting Software (Pty) Ltd., Dec. 3, 2001, in 49 pages.

"SuperNEC: GUI User Reference Manual," Version 1.00, Poynting Software (Pty) Ltd., Jul. 12, 2000, in 43 pages.

"SuperNEC: MOM Technical Reference Manual," Version 1.00, Poynting Software (Pty) Ltd., Jul. 14, 2000, in 63 pages.

"SuperNEC: MOM-UTD Hybrid User Reference Manual," Version 1.00, Poynting Software (Pty) Ltd., Jul. 14, 2000, in 68 pages.

"SuperNEC: Parallel MoM User Reference Manual," Version 1.00, Poynting Software (Pty) Ltd., Sep. 21, 1999, in 12 pages.

SuperNEC: Parallel MoM User Reference Manual, Version 2.0, Poynting Software (Pty) Ltd., Oct. 20, 2004, in 12 pages.

Zientara et al., "Dynamic Adaptive MR Imaging Using Multi-Resolution SVD Encoding Incorporating Optical Flow-Based Predictions," Report of National Academy of Sciences Committee on the "Mathematics and Physics of Emerging Dynamic Biomedical Imaging," Nov. 1993.

Baharav, Zachi, "Impedance Matrix Compression (IMC) Using Iteratively Selected Wavelet Basis," IEEE Transactions on Antennas and Propagation, vol. 46, No. 2, Feb. 2, 1998, pp. 226-233.

Bank, Randolph E., "Marching Algorithms and Block Gaussian Elimination," Sparse Matrix Computations, 1976, pp. 293-307.

Canning, Francis X., "Impedance Matrix Produces a Sparse Moment Method Matrix," IEEE Antennas and Propagation Society International Symposium, 1990. AP-S. 'Merging Technologies for the 90's.' Digest, May 1990, pp. 60-63.

Coifman et al., "Faster Single-Stage Multipole Method for the Wave Equation," Conference Proceedings; $10^{th}$ Annual Review of Progress in Applied Computational Electromagnetics; at the Doubletree Hotel & Convention Center, Monterey, CA, vol. 1, Mar. 21-26, 1994, pp. 19-24.

Conroy et al., "Data-Parallel Sparse LU Factorization," Siam J. Sci. Comput., vol. 19, No. 2, Mar. 1998, pp. 584-604.

George, Alan, "On Block Elimination for Sparse Linear Systems," Siam J. Numer Anal, vol. 11, No. 3, Jun. 1974, pp. 585-603.

Hackbusch, Leipzig W., "A Sparse Matrix Arithmetic Based on H-Matrices. Part I: Introduction to H-Matrices," Computing 62, pp. 89-108, 1999.

Higham, Nicholas J., "Block LU Factorization," Accuracy and Stability of Numerical Algorithms, Siam, 1996, pp. 245-259.

Kapur et al., "Efficient Electrostatic and Electromagnetic Simulation Using IES3," IEEE Journal on Comp. Eng., Dec. 1998.

Kastner et al., "Multi-Region Reduced Field Testing (RFT) for Matrix Thinning," Third International Conference on Computation in Electromagnetics, Apr. 1996, pp. 312-317.

Nabors et al., "FastCap: A Multipole Accelerated 3-D Capacitance Extraction Program," IEEE Transactions on Computer Aided Design, vol. 10, No. 11, Nov. 1991, pp. 1447-1459.

Porgorzelski, Ronald J., "Improved Computational Efficiency via Near-Field Localization," IEEE Transactions on Antennas and Propagation, vol. 41, No. 8, Aug. 1993, pp. 1081-1087.

Saad et al., "Bilutm: A Domain-Based Multilevel Block Ilut Preconditioner for General Sparse Matrices," Siam J. Matrix Anal. Appl., vol. 21, No. 1, 1999, pp. 279-299.

Yalamov et al., "On the Stability of a Partitioning Algorithm for Tridiagonal Systems," Siam J. Matrix Anal. Appl., vol. 20, No. 1, 1998, pp. 159-181.

Office Action dated Aug. 12, 2004 from Related U.S. Appl. No. 09/676,727.

Office Action dated Jun. 16, 2005 from Related U.S. Appl. No. 09/676,727.

Advisory Action dated Sep. 1, 2005 from Related U.S. Appl. No. 09/676,727.

Office Action dated Dec. 19, 2005 from Related U.S. Appl. No. 09/676,727.

Office Action dated Aug. 24, 2006 from Related U.S. Appl. No. 09/676,727.

Office Action dated Jan. 26, 2007 from Related U.S. Appl. No. 09/676,727.

Office Action dated May 8, 2007 from Related U.S. Appl. No. 09/676,727.

Office Action dated Oct. 17, 2007 from Related U.S. Appl. No. 09/676,727.

Advisory Action dated Dec. 27, 2007 from Related U.S. Appl. No. 09/676,727.

Office Action dated Jun. 28, 2006 from Related U.S. Appl. No. 10/354,241.

Office Action dated Feb. 26, 2007 from Related U.S. Appl. No. 10/354,241.

Advisory Action dated May 11, 2007 from Related U.S. Appl. No. 10/354,241.

Office Action dated Oct. 22, 2007 from Related U.S. Appl. No. 10/354,241.

Office Action dated Jul. 3, 2006 from Related U.S. Appl. No. 10/619,796.

Office Action dated Mar. 26, 2007 from Related U.S. Appl. No. 10/619,796.

Advisory Action dated Jun. 15, 2007 from Related U.S. Appl. No. 10/619,796.

Office Action dated Oct. 19, 2007 from Related U.S. Appl. No. 10/619,796.

Office Action dated Nov. 1, 2007 from Related U.S. Appl. No. 11/417,559.

Office Action dated May 16, 2007 from Related U.S. Appl. No. 11/417,429.

Office Action dated Jan. 3, 2008 from Related U.S. Appl. No. 11/417,429.

Bebendorf, Mario, "Approximation of Boundary Element Matrices," Numer. Math. 86, 2000, pp. 565-589.

Bebendorf, M., "Hierarchical LU Decomposition-Based Preconditioners for BEM," Computer 74, 2005, pp. 225-247.

Burkholder, Robert J., "Fast Dual-MGS Block-Factorization Algorithm for Dense MoM Matrices," IEEE Transactions on Antennas and Propagation, Jul. 2004, vol. 52, No. 7, pp. 1693-1699.

Frieze et al., "Fast Monte-Carlo Algorithms for Finding Low-Rank Approximations," Journal of the ACM, Nov. 2004, vol. 51, No. 6, pp. 1025-1041.

Kurz et al., "Application of the Adaptive Cross Approximation Technique for the Coupled BE-FE Solution of Electromagnetic Problems," IABEM 2002, International Association for Boundary Element Methods, UT Austin, Texas, May 28-30, 2002.

Kurz et al., "Application of the Adaptive Cross Approximation Technique for the Coupled BE-FE Solution of Symmetric Electromagnetic Problems," Computational Mechanics 32, 2003, pp. 423-429.

Kurz et al., "The Adaptive Cross-Approximation Technique for the 3-D Boundary-Element Method," IEEE Transactions on Magnetics, Mar. 2002, vol. 38, No. 2, pp. 421-424.

Martinsson et al.., "A Fast Direct Solver for Boundary Integral Equations in Two Dimensions," Journal of Computational Physics 205, 2005, pp. 1-23.

Ostrowski et al., "Fast BEM-Solution of Laplace Problems With $H$-Matrices and ACA," IEEE Transactions on Magnetics, Apr. 2006, vol. 42, No. 4, pp. 627-630.

Seo et al., "A Fast IE-FFT Algorithm for Solving PEC Scattering Problems," IEEE Transactions on Magnetics, May 2005, vol. 41, No. 5, pp. 1476-1479.

Shaeffer, John F., "LU Factorization and Solve of Low Rank Electrically Large MOM Problems for Monostatic Scattering Using the Adaptive Cross Approximation for Problem Sizes to 1,025,101 Unknowns on a PC Workstation," Antennas and Propagation International Symposium, 2007 IEEE, Jun. 9-15, 2007, pp. 1273-1276.

Shaeffer et al., "Adaptive Cross Approximation for MOM Matrix Fill for PC Problem Sizes to 157000 Unknowns," Wireless Communications and Applied Computational Electromagnetecs, IEEE/ACES International Conference, Apr. 3-7, 2005, pp. 748-753.

Smajic et al., "Fast BEM for Eddy-Current Problems Using H-Matrices and Adaptive Cross Approximation," IEEE Transactions on Magnetics, Apr. 2007, vol. 43, No. 4, pp. 1269-1272.

Zhao et al., "The Adaptive Cross Approximation Algorithm for Accelerated Method of Moments Computations of EMC Problems," IEEE Transactions on Electromagnetic Compatibility, Nov. 2005, vol. 47, No. 4, pp. 763-773.

Office Action dated Feb. 2, 2009 from Related U.S. Appl. No. 09/676,727.

Notice of Allowance dated Jan. 28, 2010 from Related U.S. Appl. No. 09/676,727.

Office Action dated May 1, 2009 from Related U.S. Appl. No. 10/354,241.
Notice of Allowance dated Jan. 6, 2010 from Related U.S. Appl. No. 10/354,241.
Office Action dated Mar. 5, 2009 from Related U.S. Appl. No. 10/619,796.
Office Action dated May 22, 2009 from Related U.S. Appl. No. 10/619,796.
Notice of Allowance dated Jan. 22, 2010 from Related U.S. Appl. No. 10/619,796.
Office Action dated May 29, 2008 from Related U.S. Appl. No. 09/676,727.
Office Action dated May 15, 2008 from Related U.S. Appl. No. 10/354,241.
Advisory Action dated Jul. 29, 2008 from Related U.S. Appl. No. 10/354,241.
Office Action dated Jun. 20, 2008 from Related U.S. Appl. No. 10/619,796.
Office Action dated Jun. 18, 2008 from Related U.S. Appl. No. 11/417,429.

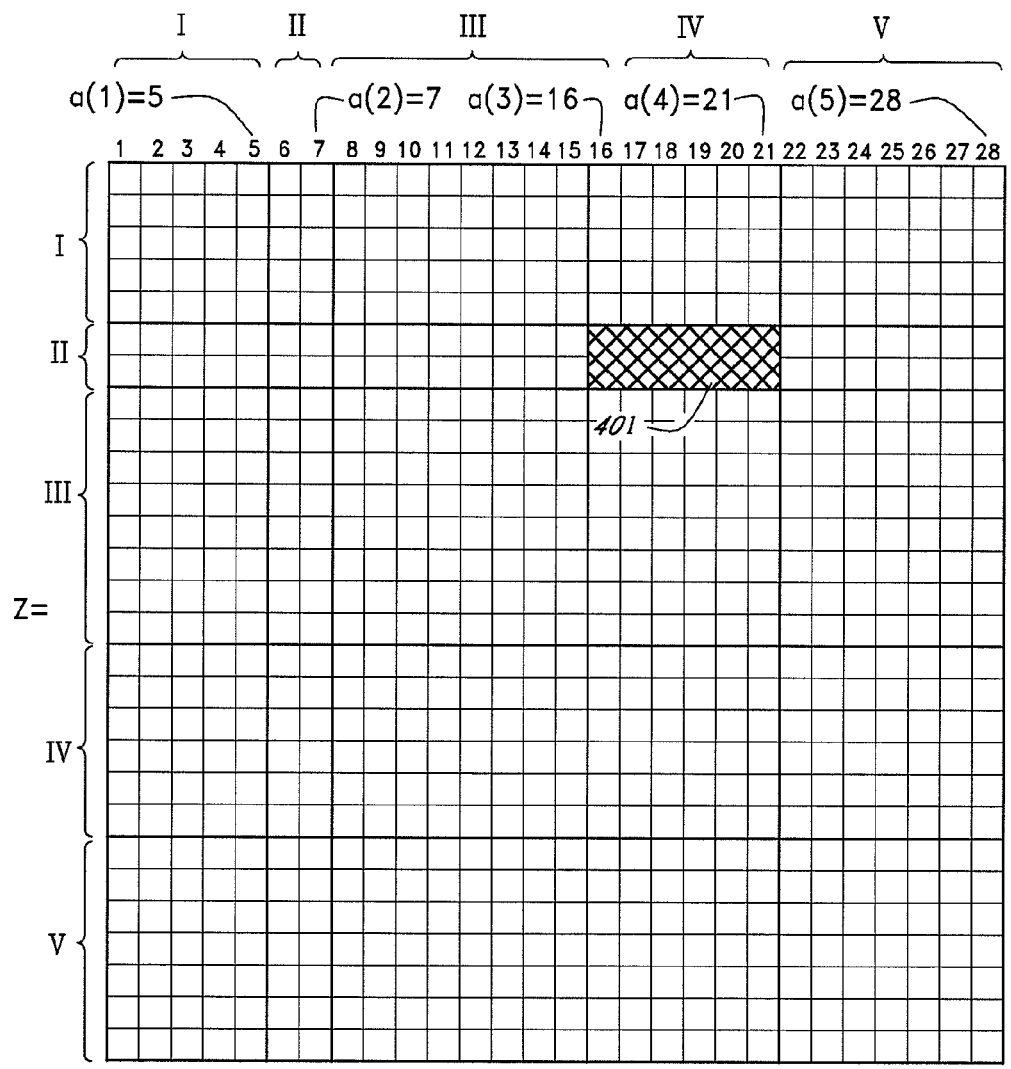
FIG. 4

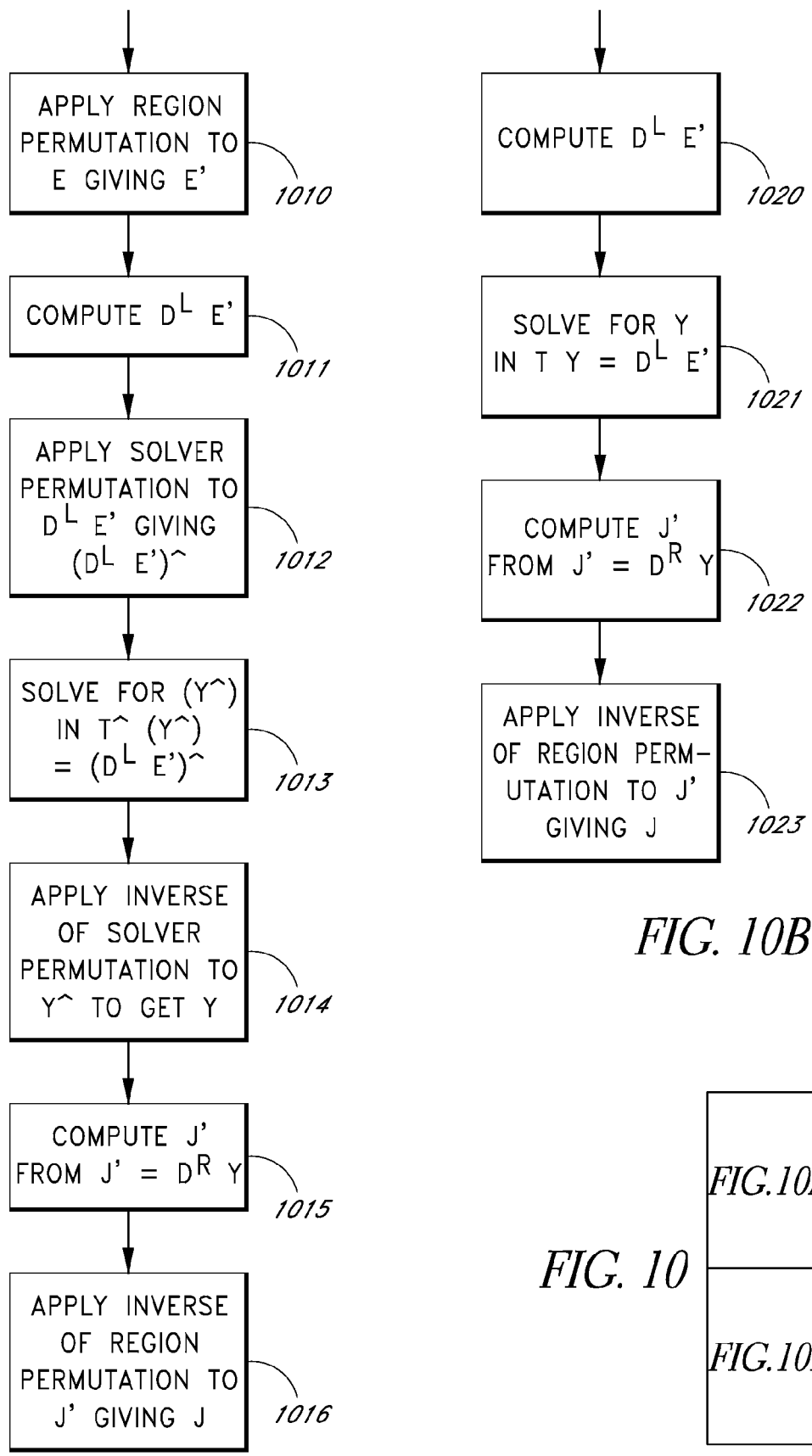

COMPRESSION AND COMPRESSED INVERSION OF INTERACTION DATA

RELATED APPLICATIONS

The present application is a continuation-in-part of U.S. patent application Ser. No. 09/676,727, filed Sep. 29, 2000, titled "COMPRESSION AND COMPRESSED INVERSION OF INTERACTION DATA," the entire contents of which are hereby incorporated by reference.

BACKGROUND OF THE INVENTION

1. Field of the Invention

The invention relates to methods for compressing the stored data, and methods for manipulating the compressed data, in numerical solutions involving numerous mutual interactions, especially when the nature of these interactions approaches an asymptotic form for large distances, such as, for example, antenna problems solved using the method of moments.

2. Description of the Related Art

Many numerical techniques are based on a "divide and conquer" strategy wherein a complex structure or a complex problem is broken up into a number of smaller, more easily solved problems. Such strategies are particularly useful for solving integral equation problems involving radiation, heat transfer, scattering, mechanical stress, vibration, and the like. In a typical solution, a larger structure is broken up into a number of smaller structures, called elements, and the coupling or interaction between each element and every other element is calculated. For example, if a structure is broken up into 16 elements, then the inter-element mutual interaction (or coupling) between each element and every other element can be expressed as a 16 by 16 interaction matrix.

As computers become more powerful, such element-based numerical techniques are becoming increasingly important. However, when it is necessary to simultaneously keep track of many, or all, mutual interactions, the number of such interactions grows very quickly. The size of the interaction matrix often becomes so large that data compression schemes are desirable or even essential. Also, the number of computer operations necessary to process the data stored in the interaction matrix can become excessive. The speed of the compression scheme is also important, especially if the data in the interaction matrix has to be decompressed before it can be used.

Typically, especially with radiation-type problems involving sound, vibration, stress, temperature, electromagnetic radiation, and the like, elements that are physically close to one another produce strong interactions. Elements that are relatively far apart (usually where distance is expressed in terms of a size, wavelength, or other similar metric) will usually couple less strongly. For example, when describing the sound emanating from a loudspeaker, the sound will change in character relatively quickly in the vicinity of that speaker. If a person standing very near the speaker moves one foot closer, the sound may get noticeably louder. However, if that person is sitting at the other end of a room, and moves one foot closer, then the change in volume of the sound will be relatively small. This is an example of a general property of many physical systems. Often, in describing the interaction of two nearby objects, relatively more detail is needed for an accurate description, while relatively less detail is needed when the two objects are further apart.

As another example, consider a speaker producing sound inside a room. To determine the sound intensity throughout that room, one can calculate the movement (vibration) of the walls and objects in the room. Typically such calculation will involve choosing a large number of evenly spaced locations in the room, and determining how each location vibrates. The vibration at any one location will be a source of sound, which will typically react with every other location in the room. The number of such interactions would be very large and the associated storage needed to describe such interactions can become prohibitively large. Moreover, the computational effort needed to solve the matrix of interactions can become prohibitive.

SUMMARY OF THE INVENTION

The present invention solves these and other problems by providing a compression scheme for interaction data and an efficient method for processing the compressed data without the need to first decompress the data. In other words, the data can be numerically manipulated in its compressed state.

Given a first region containing sources relatively near to each other, and a second region containing sources relatively near to each other, but removed from the first region; one embodiment provides a simplified description of the possible interactions between these two regions. That is, the first region can contain a relatively large number of sources and a relatively large amount of data to describe mutual interactions between sources within the first region. In one embodiment, a reduced amount of information about the sources in the first region is sufficient to describe how the first region interacts with the second region. One embodiment includes a way to find these reduced interactions with relatively less computational effort than in the prior art.

For example, one embodiment includes a first region of sources in one part of a problem space, and a second region of sources in a portion of the problem space that is removed from the first region. Original sources in the first region are modeled as composite sources (with relatively fewer composite sources than original sources). In one embodiment, the composite sources are described by linear combinations of the original sources. The composite sources are reacted with composite testers to compute interactions between the composite sources and composite testers in the two regions. The use of composite sources and composite testers allows reactions in the room (between regions that are removed from each other) to be described using fewer matrix elements than if the reactions were described using the original sources and testers. While an interaction matrix based on the original sources and testers is typically not a sparse matrix, the interaction matrix based on the composite sources and testers is typically a sparse matrix having a block structure.

One embodiment is compatible with computer programs that store large arrays of mutual interaction data. This is useful since it can be readily used in connection with existing computer programs. In one embodiment, the reduced features found for a first interaction group are sufficient to calculate interactions with a second interaction group or with several interaction groups. In one embodiment, the reduced features for the first group are sufficient for use in evaluating interactions with other interaction groups some distance away from the first group. This permits the processing of interaction data more quickly even while the data remains in a compressed format. The ability to perform numerical operations using compressed data allows fast processing of data using multi-level and recursive methods, as well as using single-level methods.

DESCRIPTION OF THE FIGURES

The advantages and features of the disclosed invention will readily be appreciated by persons skilled in the art from the following detailed description when read in conjunction with the drawings listed below.

FIG. 4 shows an example of an interaction matrix (before transformation) for a body partitioned into five differently sized regions.

Figure 1A:
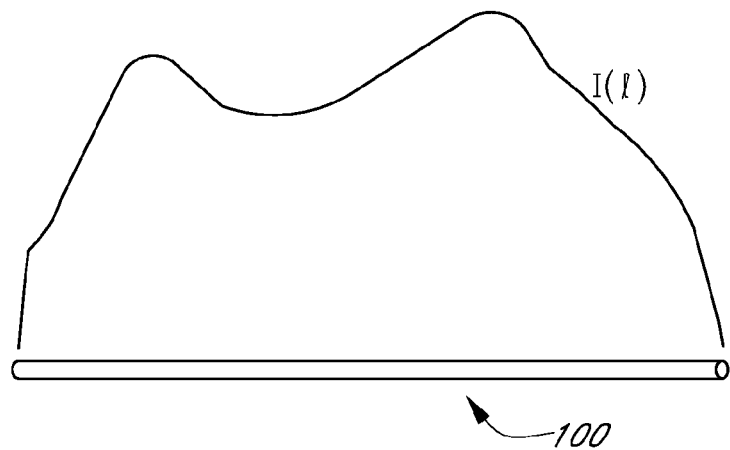
FIG. 1A illustrates a wire or rod having a physical property (e.g., a current, a temperature, a vibration, stress, etc.) I(l) along its length, where the shape of J(l) is unknown.

In the drawings, the first digit of any three-digit number generally indicates the number of the figure in which the element first appears. Where four-digit reference numbers are used, the first two digits indicate the figure number.

DETAILED DESCRIPTION

Many physical phenomena involve sources that generate a disturbance, such as an electromagnetic field, electromagnetic wave, a sound wave, vibration, a static field (e.g., electrostatic field, magnetostatic field, gravity field, etc) and the like. Examples of sources include a moving object (such as a loudspeaker that excites sound waves in air) and an electrical current (that excites electric and magnetic fields), etc. For example, the electric currents moving on an antenna produce electromagnetic waves. Many sources produce disturbances both near the source and at a distance from the source.

Sometimes it is convenient to consider disturbances as being created by an equivalent source (e.g., a fictitious source) rather than a real physical source. For example, in most regions of space (a volume of matter for example) there are a large number of positive electric charges and a large number of negative electric charges. These positive and negative charges nearly exactly cancel each other out. It is customary to perform calculations using a fictitious charge, which is the net difference between the positive and negative charge, averaged over the region of space. This fictitious charge usually cannot be identified with any specific positive or negative particle.

A magnetic current is another example of a fictitious source that is often used. It is generally assumed that magnetic monopoles and magnetic currents do not exist (while electric monopoles and electric currents do exist). Nevertheless, it is known how to mathematically relate electric currents to equivalent magnetic currents to produce the same electromagnetic waves. The use of magnetic sources is widely accepted, and has proven very useful for certain types of calculations. Sometimes, it is convenient to use a source that is a particular combination of electric and magnetic sources. A distribution of sources over some region of space can also be used as a source. The terms "sources" and "physical sources" are used herein to include all types of actual and/or fictitious sources.

A physical source at one location typically produces a disturbance that propagates to a sensor (or tester) at another location. Mathematically, the interaction between a source and a tester is often expressed as a coupling coefficient (usually as a complex number having a real part and an imaginary part). The coupling coefficients between a number of sources and a number of testers is usually expressed as an array (or matrix) of complex numbers. Embodiments of this invention includes efficient methods for the computation of these complex numbers, for the storing of these complex numbers, and for computations using these complex numbers.

The so-called Method of Moments (MoM) is an example of numerical analysis procedure that uses interactions between source functions and testing functions to numerically solve a problem that involves finding an unknown function (that is, where the solution requires the determination of a function of one or more variables). The MoM is used herein by way of example and not as a limitation. One skilled in the art will recognize that the MoM is one of many types of numerical techniques used to solve problems, such as differential equations and integral equations, where one of the unknowns is a function. The MoM is an example of a class of solution techniques wherein a more difficult or unsolvable problem is broken up into one or more interrelated but simpler problems. Another example of this class of solution techniques is Nystrom's method. The simpler problems are solved, in view of the known interrelations between the simpler problems, and the solutions are combined to produce an approximate solution to the original, more difficult, problem.

For example, FIG. 1A shows a wire or rod 100 having a physical property (e.g., a current, a temperature, a stress, a voltage, a vibration, a displacement, etc.) along its length. An expression for the physical property is shown as an unknown function I(l). The problem is to calculate I(l) using the MoM or a similar "divide and conquer" type of technique. By way of example, in many physical problems involving temperature, vibration, or electrical properties, etc. I(l) will be described by an integral equation of the form:

$$E(\overline{R}) = \int I(l) G(l, \overline{R}) dl$$

Where $G(l,\overline{R})$ is known everywhere and $E(\overline{R})$ is known for certain values of $\overline{R}$. In many circumstances, $G(l,\overline{R})$ is a Green's function, based on the underlying physics of the problem, and the value of $E(\overline{R})$ is known only at boundaries (because of known boundary conditions). The above equation is usually not easily solved because I(l) is not known, and thus the integration cannot be performed. The above integral equation can be turned into a differential equation (by taking the derivative of both sides), but that will not directly provide a solution. Regardless of whether the above equation is expressed as an integral equation or a differential equation, the equation can be numerically solved for I(l) by creating a set of simpler but interrelated problems as described below (provided that $G(l,\overline{R})$ possesses certain mathematical properties known to those of skill in the art).

Figure 1B:
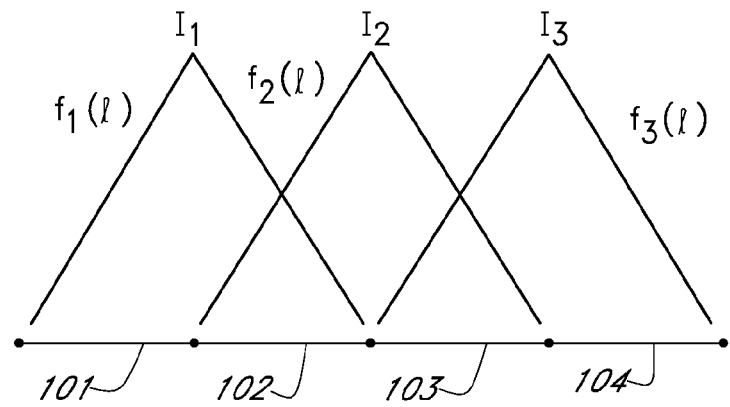
FIG. 1B illustrates the wire from FIG. 1A, broken up into four segments, where the function I(l) has been approximated by three known basis functions $f_i(l)$, and where each basis function is multiplied by an unknown constant $I_i$.

As shown in FIG. 1B, in order to compute a numerical approximation for I(l), the wire 100 is first divided up into four segments 101-104, and basis function $f_1(l)$, $f_2(l)$, and $f_3(l)$ are selected. In FIG. 1B the basis functions are shown as triangular-shaped functions that extend over pairs of segments. The unknown function I(l) can then be approximated as:

$$I(l) \approx I_1 f_1(l) + I_2 f_2(l) + I_3 f_3(l)$$

where $I_1$, $I_2$, and $I_3$ are unknown complex constants. Approximating I(l) in this manner transforms the original problem from one of finding an unknown function, to a problem of finding three unknown constants. The above approximation for I(l) is inserted into the original integral equation above to yield:

$$E(\overline{R}) = \int I_1 f_1(l) G(l,\overline{R}) dl + \int I_2 f_2(l) G(l,\overline{R}) dl + \int I_3 f_3(l) G(l,\overline{R}) dl$$

The above integrals can now be performed because the functional form of the integrands are all known ($G(l,\overline{R})$ was determined by the problem being solved, the functions $f_i(l)$ were selected, and the constants $I_1$, $I_2$ and $I_3$ can be moved outside the integrals). However, this does not yet solve the problem because the values of $I_1$, $I_2$ and $I_3$ are still unknown.

Fortunately, as indicated above, the value of $E(\overline{R})$ is usually known at various specific locations (e.g., at boundaries). Thus, three equations can be written by selecting three locations $\overline{R}_1$, $\overline{R}_2$, $\overline{R}_3$, where the value of $E(\overline{R})$ is known. Using these three selected locations, the above equation can be written three times as follows:

$$E(\overline{R}_1) = I_1 \int f_1(l) G(l,\overline{R}_1) dl + I_2 \int f_2(l) G(l,\overline{R}_1) dl + I_3 \int f_3(l) G(l,\overline{R}_1) dl$$

$$E(\overline{R}_2) = I_1 \int f_1(l) G(l,\overline{R}_2) dl + I_2 \int f_2(l) G(l,\overline{R}_2) dl + I_3 \int f_3(l) G(l,\overline{R}_2) dl$$

$$E(\overline{R}_3) = I_1 \int f_1(l) G(l,\overline{R}_3) dl + I_2 \int f_2(l) G(l,\overline{R}_3) dl + I_3 \int f_3(l) G(l,\overline{R}_3) dl$$

Rather than selecting three specific locations for $E(\overline{R})$, it is known that the accuracy of the solution is often improved by integrating known values of $E(\overline{R})$ using a weighting function over the region of integration. For example, assuming that $E(\overline{R})$ is known along the surface of the wire 100, then choosing three weighting functions $g_1(l)$, $g_2(l)$, and $g_3(l)$, the desired three equations in three unknowns can be written as follows (by multiplying both sides of the equation by $g_i(l)$ and integrating):

$$\int E(l') g_1(l') dl' = I_1 \iint f_1(l) g_1(l') G(l,l') dl dl' + I_2 \iint f_2(l) g_1(l') G(l,l') dl dl' + I_3 \iint f_3(l) g_1(l') G(l,l') dl dl'$$

$$\int E(l') g_2(l') dl' = I_1 \iint f_1(l) g_2(l') G(l,l') dl dl' + I_2 \iint f_2(l) g_2(l') G(l,l') dl dl' + I_3 \iint f_3(l) g_2(l') G(l,l') dl dl'$$

$$\int E(l') g_3(l') dl' = I_1 \iint f_1(l) g_3(l') G(l,l') dl dl' + I_2 \iint f_2(l) g_3(l') G(l,l') dl dl' + I_3 \iint f_3(l) g_3(l') G(l,l') dl dl'$$

Note that the above double-integral equations reduce to the single-integral forms if the weighting functions $g_i(l)$ are replaced with delta functions.

The three equations in three unknowns can be expressed in matrix form as:

$$V = ZI$$

or $$\begin{bmatrix} V_1 \\ V_2 \\ V_3 \end{bmatrix} = \begin{bmatrix} Z_{11} & Z_{12} & Z_{13} \\ Z_{21} & Z_{22} & Z_{23} \\ Z_{31} & Z_{32} & Z_{33} \end{bmatrix} \begin{bmatrix} I_1 \\ I_2 \\ I_3 \end{bmatrix}$$

where $$V_i = \int E(l') g_i(l') dl'$$

and $$Z_{ij} = \int \int f_j(l) g_i(l') G(l,l') dl dl'$$

$$Z_{ij} = \iint f_j(l) g_i(l') G(l,l') dl dl'$$

Figure 1C:
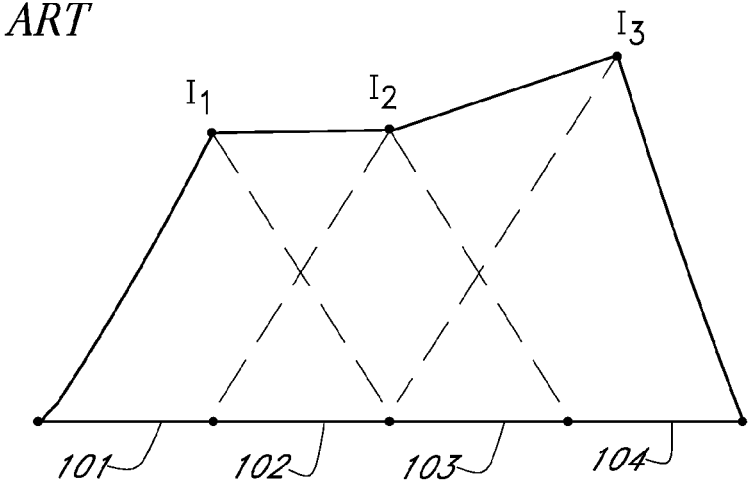
FIG. 1C illustrates a piecewise linear approximation to the function I(l) after the constants $I_i$ have been determined.

Solving the matrix equation yields the values of $I_1$, $I_2$, and $I_3$. The values $I_1$, $I_2$, and $I_3$ can then be inserted into the equation $I(l) \approx I_1 f_1(l) + I_2 f_2(l) + I_3 f_3(l)$ to give an approximation for I(l). If the basis functions are triangular functions as shown in FIG. 1B, then the resulting approximation for I(l) is a piecewise linear approximation as shown in FIG. 1C. The $I_i$ are the unknowns and the $V_i$ are the conditions (typically, the $V_i$ are knowns). Often there are the same number of conditions as unknowns. In other cases, there are more conditions than unknowns or less conditions than unknown.

The accuracy of the solution is largely determined by the shape of the basis functions, by the shape of the weighting functions, and by the number of unknowns (the number of unknowns usually corresponds to the number of basis functions).

Unlike the Moment Method described above, some techniques do not use explicit basis functions, but, rather, use implicit basis functions or basis-like functions. For example, Nystrom's method produces a numerical value for an integral using values of the integrand at discrete points and a quadrature rule. Although Nystrom's method does not explicitly use an expansion in terms of explicit basis functions, nevertheless, in a physical sense, basis functions are still being used (even if the use is implicit). That is, the excitation of one unknown produces some reaction throughout space. Even if the computational method does not explicitly use a basis function, there is some physical excitation that produces approximately the same reactions. All of these techniques are similar, and one skilled in the art will recognize that such techniques can be used with the present invention. Accordingly, the term "basis function" will be used herein to include such implicitly used basis functions. Similarly, the testers may be implicitly used.

When solving most physical problems (e.g., current, voltage, temperature, vibration, force, etc), the basis functions tend to be mathematical descriptions of the source of some physical disturbance. Thus, the term "source" is often used to refer to a basis function. Similarly, in physical problems, the weighting functions are often associated with a receiver or sensor of the disturbance, and, thus, the term "tester" is often used to refer to the weighting functions.

As described above in connection with FIGS. 1A-1C, in numerical solutions, it is often convenient to partition a physical structure or a volume of space into a number of smaller pieces and associate the pieces with one or more sources and testers. In one embodiment, it is also convenient to partition the structure of (or volume) into regions, where each region contains a group of the smaller pieces. Within a given region, some number of sources is chosen to describe with sufficient detail local interactions between sources and testers within that region. A similar or somewhat smaller number of sources in a given region is generally sufficient to describe interactions between sources in the source region and testers in the regions relatively close by. When the appropriate sources are used, an even smaller number of sources is often sufficient to describe interactions between the source region and testers in regions that are not relatively close by (i.e., regions that are relatively far from the source region).

Embodiments of the present invention include methods and techniques for finding composite sources. Composite sources are used in place of the original sources in a region such that a reduced number of composite sources is needed to calculate the interactions with a desired accuracy.

In one embodiment, the composite sources for a first region are the same regardless of whether the composite sources in the first region are interacting with a second region, a third region, or other regions. The use of the same composite sources throughout leads to efficient methods for factoring and solving the interaction matrix.

Considering the sources in the first region, one type of source is the so-called multipole, as used in a multipole expansion. Sources like wavelets are also useful. In some cases wavelets allow a reduced number of composite sources to be used to describe interactions with distant regions. However, there are disadvantages to wavelet and multipole approaches. Wavelets are often difficult to use, and their use often requires extensive modifications to existing or proposed computer programs. Wavelets are difficult to implement on non-smooth and non-planar bodies.

Multipole expansions have stability problems for slender regions. Also, while a multipole expansion can be used for describing interactions with remote regions, there are severe problems with using multipoles for describing interactions within a region or between spatially close regions. This makes a factorization of the interaction matrix difficult. It can be very difficult to determine how to translate information in an interaction matrix into a wavelet or multipole representation.

Figure 2:
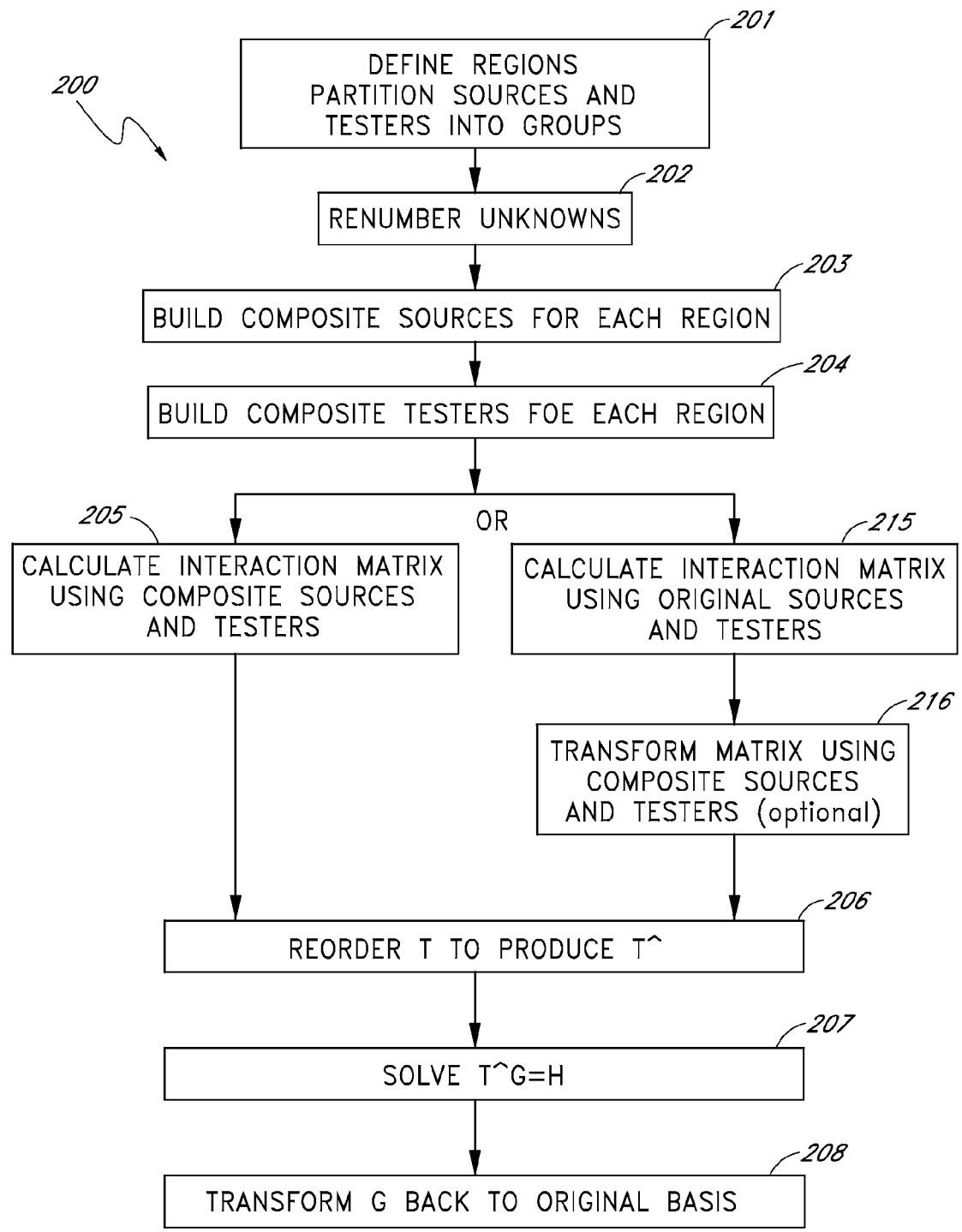
FIG. 2 is a flowchart showing the process steps used to generate a compressed (block sparse) interaction matrix.

FIG. 2 is a flowchart that illustrates a compression technique 200 for compressing an interaction matrix by combining groups of sources and groups of testers into composite sources and testers. The use of composite sources and composite testers allows the original interaction matrix to be transformed into a block sparse matrix having certain desirable properties.

Embodiments of the present invention include a technique for computing and using composite sources to provide compression of an interaction matrix by transforming the interaction matrix into a block sparse matrix. The present technique is compatible with existing and proposed computer programs. It works well even for rough surfaces and irregular grids of locations. For a given region, the composite sources allow computation of a disturbance (e.g., radiation) produced by the source throughout a desired volume of space. A reduced number of these composite sources is sufficient to calculate (with a desired accuracy) disturbances at other relatively distant regions. This method of compressing interaction data can be used with a variety of computational methods, such as, for example, an LU (Lower Triangular Upper triangular) factorization of a matrix or as a preconditioned conjugate gradient iteration. In many cases, the computations can be done while using the compressed storage format.

FIG. 2 is a flowchart 200 illustrating the steps of solving a numerical problem using composite sources. The flowchart 200 begins in a step 201 where a number of original sources and original testers are collected into groups, each group corresponding to a region. Each element of the interaction matrix describes an interaction (a coupling) between a source and a tester. The source and tester are usually defined, in part, by their locations in space. The sources and testers are grouped according to their locations in space. In one embodiment, a number of regions of space are defined. A reference point is chosen for each region. Typically the reference point will lie near the center of the region. The sources and testers are grouped into the regions by comparing the location of the source or tester to the reference point for each region. Each source or tester is considered to be in the region associated with the reference point closest to the location. (For convenience, the term "location" is used hereinafter to refer to the location of a source or a tester.)

Other methods for grouping the sources and testers (that is, associating locations with regions) can also be used. The process of defining the regions is problem-dependent, and in some cases the problem itself will suggest a suitable set of regions. For example, if the sources and testers are located on the surface of a sphere, then curvilinear-square regions are suggested. If the sources and testers are located in a volume of space, then cubic regions are often useful. If the sources and testers are located on a complex three-dimensional surface, then triangular patch-type regions are often useful.

Figure 3:
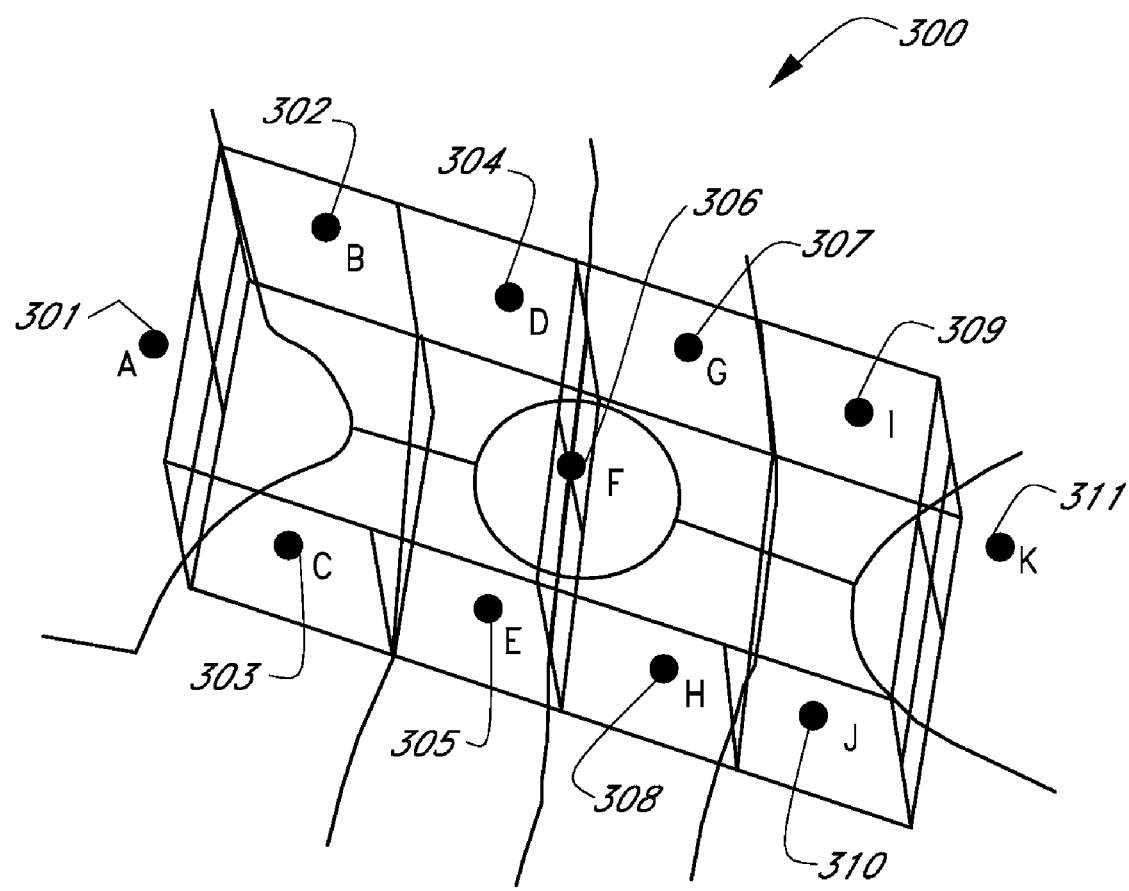
FIG. 3 illustrates partitioning a body into regions.

Generally the way in which the regions are defined is not critical, and the process used to define the regions will be based largely on convenience. However, it is usually preferable to define the regions such that the locations of any region are relatively close to each other, and such that there are relatively few locations from other regions close to a given region. In other words, efficiency of the compression algorithm is generally improved if the regions are as isolated from one another as reasonably possible. Of course, adjacent regions are often unavoidable, and when regions are adjacent to one another, locations near the edge of one region will also be close to some locations in an adjacent region. Nevertheless, the compression will generally be improved if, to the extent reasonably possible, regions are defined such that they are not slender, intertwining, or adjacent to one another. For example, FIG. 3 illustrates a volume of space partitioned into a rectangular box 300 having eleven regions A through K corresponding to reference points 301-311.

As shown in FIG. 2, after the step 201 the process advances to a step 202. In the step 202, the unknowns are renumbered, either explicitly or implicitly, so that locations within the same region are numbered consecutively. It is simpler to continue this description as if the renumbering has actually been done explicitly. However, the following analysis can also be performed without explicit renumbering.

The term "spherical angles" is used herein to denote these angles. One skilled in the art will recognize that if a two-dimensional problem is being solved, then the spherical angles reduces to a planar angle. Similarly, one skilled in the art will recognize that if a higher-dimensional problem is being solved (such as, for example, a four dimensional space having three dimensions for position and one dimension for time) then the term spherical angle denotes the generalization of the three-dimensional angle into four-dimensional space. Thus, in general, the term spherical angle is used herein to denote the notion of a "space-filling" angle for the physical problem being solved.

After renumbering, the process advances to a block 203 where one or more composite sources for each region are determined. If there are p independent sources within a region, then q composite sources can be constructed (where $q \leq p$). The construction of composite sources begins by determining a relatively dense set of far-field patterns (usually described in a spherical coordinate system) at relatively large distances from the region. As used herein, far-field refers to the field in a region where the field can be approximated in terms of an asymptotic behavior. For example, in one embodiment, the far-field of an antenna or other electromagnetic radiator includes the field at some distance from the antenna, where the distance is relatively larger than the electrical size of the antenna.

A far-field pattern is constructed for each independent source. In the present context, dense means to avoid having any overly-large gaps in the spherical angles used to calculate the set of disturbances. Dense also means that if the disturbance is represented by a vector, then each vector component is represented. For example, for a scalar problem, one might choose p spherical angles. These angles are typically substantially equally spaced, and the ranges of angles include the interaction angles occurring in the original interaction matrix (if all of the interactions described in the original matrix lie within a plane, then one can choose directions only within that plane rather than over a complete sphere).

The far-field data is stored in a matrix s having p columns (one column for each source location within the region), and rows associated with angles. While each source is logically associated with a location in a given region, these sources are not necessarily located entirely within that region. While each source corresponds to a location (and each location is assigned to a region), sources that have a physical extent can extend over more than one region. The entries in the matrix s can be, for example, the field quantity or quantities that emanate from each source. It is desirable that the field quantity is chosen such that when it (or they) are zero at some angle then, to a desired approximation, all radiated quantities are zero at that angle. While it is typically desirable that the angles be relatively equally spaced, large deviations from equal spacing can be acceptable.

These composite sources are in the nature of equivalent sources. A smaller number of composite sources, compared to the number of sources they replace, can produce similar disturbances for regions of space removed from the region occupied by these sources.

As described above, sources are collected into groups of sources, each group being associated with a region. For each group of sources, a group of composite sources is calculated. The composite source is in the nature of an equivalent source that, in regions of space removed from the region occupied by the group in replaces, produces a far-field (disturbance) similar to the field produced by the group it replaces. Thus, a composite source (or combination of composite sources) efficiently produces the same approximate effects as the group of original sources at desired spherical angles and at a relatively large distance. To achieve a relatively large distance, is it often useful to use a limiting form as the disturbance goes relatively far from its source.

Each composite source is typically a linear combination of one or more of the original sources. A matrix method is used to find composite sources that broadcast strongly and to find composite sources that broadcast weakly. These composite sources are constructed from the original sources. The matrix method used to find composite sources can be a rank-revealing factorization such as singular value decomposition. For a singular value decomposition, the unitary transformation associated with the sources gives the composite sources as a linear combination of sources.

Variations of the above are possible. For example, one can apply the singular value decomposition to the transpose of the s matrix. One can employ a Lanczos Bi-diagonalization, or related matrix methods, rather than a singular value decomposition. There are other known methods for computing a low rank approximation to a matrix. Some examples of the use of Lanczos Bidiagonalization are given in Francis Canning and Kevin Rogovin, "Fast Direct Solution of Standard Moment-Method Matrices," IEEE AP Magazine, Vol. 40, No. 3, June 1998, pp. 15-26.

There are many known methods for computing a reduced rank approximation to a matrix. A reduced rank approximation to a matrix is also a matrix. A reduced rank matrix with m columns can be multiplied by any vector of length m. Composite sources that broadcast weakly are generally associated with the space of vectors for which that product is relatively small (e.g., in one embodiment, the product is zero or close to zero). Composite sources that broadcast strongly are generally associated with the space of vectors for which that product is not necessarily small.

Composite sources can extend over more than one region. In one embodiment, this is achieved by using the technique used with Malvar wavelets (also called local cosines) to extend Fourier transforms on disjoint intervals to overlapping orthogonal functions.

Persons of ordinary skill in the art know how near-field results are related to far-field results. A relationship between near-field and far-field can be used in a straightforward way to transform the method described above using far-field data into a method using near-field data. Note that, the "far-field" as used herein is not required to correspond to the traditional $2 d^2/\lambda$ far-field approximation. Distances closer than $2 d^2/\lambda$ can be used (although closer distances will typically need more composite sources to achieve a desired accuracy). A distance corresponding to the distance to other physical regions is usually far enough, and even shorter distances can be acceptable.

Once composite sources are found, the process advances to a step 204 where composite testers are found. Composite testers are found in a manner analogous to the way that composite sources are found. Recall that composite sources are found using the way in which sources of the interaction matrix "broadcast" to distant locations. Composite testers are found using the way in which the testers of the interaction matrix "receive" from a dense group of directions for a distant disturbance. It is helpful if the received quantity or quantities which are used include relatively all field quantities, except (optionally) those which are very weakly received. For example, when receiving electromagnetic radiation from a distant source, the longitudinal component is approximately zero and can often be neglected. A matrix R describing how these testers receive is formed. A matrix method is used to construct composite testers that receive strongly and testers that receive weakly. The matrix method can be a rank-revealing factorization such as singular value decomposition. A singular value decomposition gives the composite testers as a linear combination of the testers which had been used in the original matrix description.

Once composite sources and testers have been found, the process advances to a step 205 or to a step 215 where the interaction matrix is transformed to use composite sources and testers. The steps 205 and 215 are alternatives. FIG. 4 shows an example of an interaction matrix 400 having 28 unknowns (28 sources and 28 testers) grouped into five physical regions (labeled I-V). The shaded block 401 of the matrix 400 represents the interaction for sources in the fourth region (region IV) and testers in the second region (region II). The interaction of a pair of regions describes a block in the interaction matrix 400. The blocks of the transformed matrix can be computed at any time after the composite functions for their source and tester regions are both found. That is, the block 401 can be computed after composite sources for region IV and testers for region II are found.

The step 215 of FIG. 2 shows one method for computing all of the blocks in the matrix 400 by computing the entries for these blocks using the original sources and testers. Then, the process advances to an optional step 216 where these blocks are transformed into a description in terms of the composite sources and composite testers.

One advantage of using composite sources and testers is that many entries in the transformed matrix will be zero. Therefore, rather than transforming into a description using composite modes, the step 205 shows calculation of the transformed block directly using the composite sources and composite testers (without first calculating the block using the original sources and testers). In other words, the composite sources are used as basis functions, and the composite testers are used as weighting functions. Within each block, entries that are known au priori to be zero (or very small) are not calculated.

Further savings in the storage required are possible. After each block has been transformed, only the largest elements are kept. No storage needs to be used for the elements that are approximately zero. Many types of block structures, including irregular blocks and multilevel structures, can also be improved by the use of this method for storing a block sparse matrix. This will usually result in a less regular block structure. As an alternative, it is also possible to store a portion of the interaction data using composite sources and testers and to store one or more other portions of the data using another method.

Figure 5:
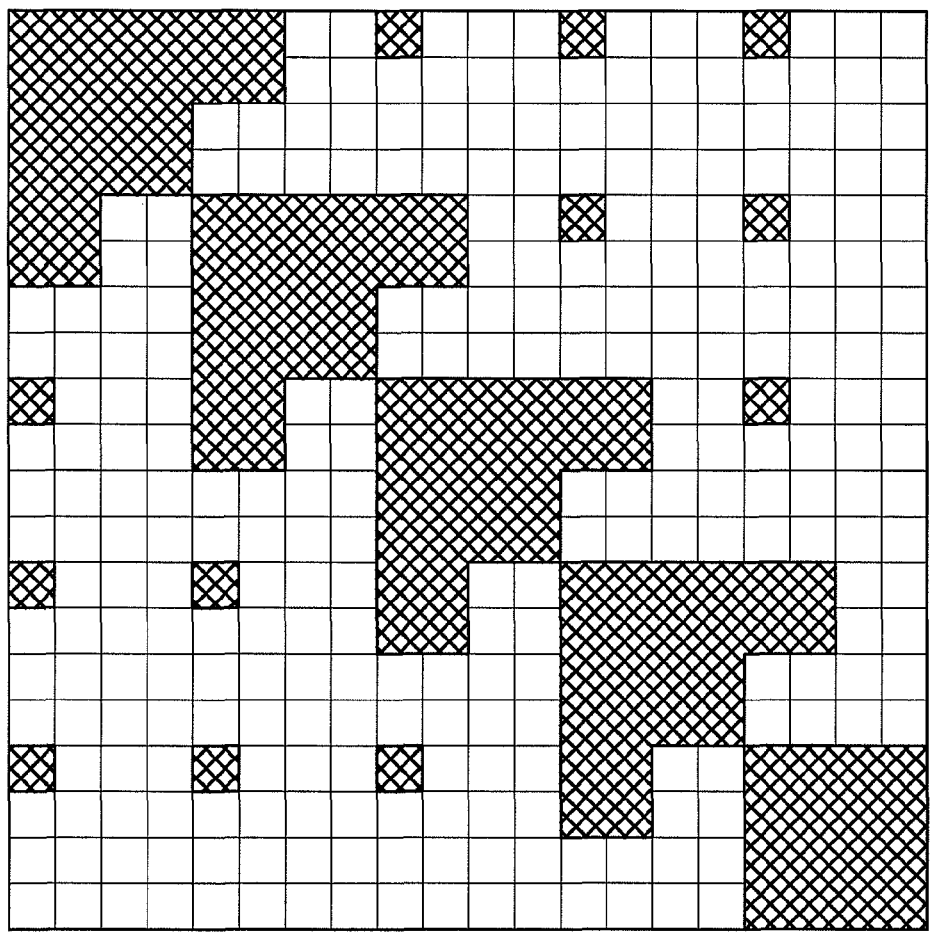
FIG. 5 shows an example of an interaction matrix after transformation (but before reordering) for a body partitioned into five regions of uniform size.

The non-zero elements of the interaction matrix typically occur in patterns. After either the step 205 or the step 216, the process advances to a step 206 where the interaction matrix is reordered to form regular patterns. For a more uniform case, where all of the regions have the same number of sources, the resulting transformed matrix T is shown in FIG. 5. FIG. 5 shows non-zero elements as shaded and zero elements as unshaded. If only a compressed storage scheme is desired, the process can stop here. However, if it is desired to calculate the inverse of this matrix, or something like its LU (lower-upper triangular) factorization, then a reordering can be useful.

Figure 6:
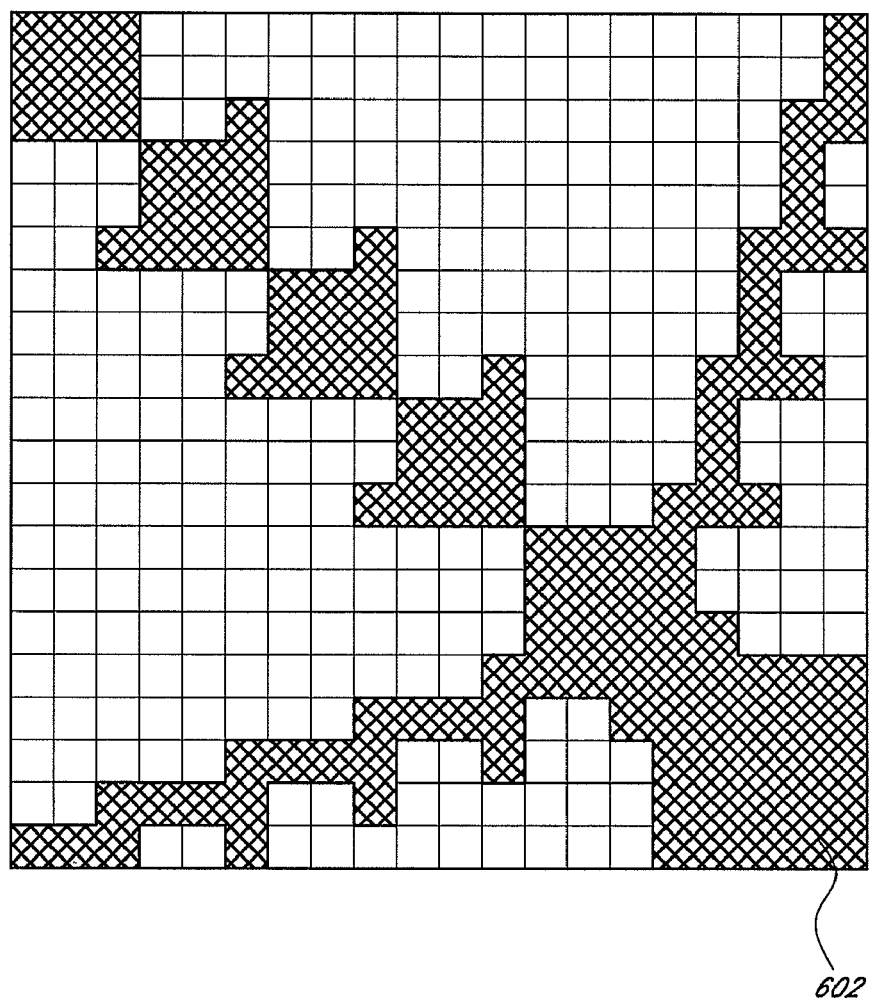
FIG. 6 shows an example of an interaction matrix after transformation and reordering for a body partitioned into five regions of uniform size.

The rows and columns of the interaction matrix can be reordered, to produce a matrix $\hat{T}$ in the form shown in FIG. 6. This permutation moves the composite sources that broadcast strongly to the bottom of the matrix, and it moves the composite testers which receive strongly to the right side of the matrix. The interaction between composite sources and composite testers is such that the sizes of the matrix elements can be estimated au priori. A matrix element that corresponds to an interaction between a composite source that radiates strongly and a composite tester that receives strongly will be relatively large. A matrix element that corresponds to an interaction between a composite source that radiates strongly and a composite tester that receives weakly will be relatively small. Similarly, a matrix element that corresponds to an interaction between a composite source that radiates weakly and a composite tester that receives strongly will be relatively small. A matrix element that corresponds to an interaction between a composite source that radiates weakly and a composite tester that receives weakly will be very small.

The permuted matrix $\hat{T}$ often will tend to be of a banded form. That is, the non-zero elements down most of the matrix will tend to be in a band near the diagonal. For a matrix of this form, there are many existing sparse-matrix LU factorers and other matrix solvers, that work well. The order shown in FIG. 6 is one example. The LU decomposition of the matrix $\hat{T}$ can be computed very rapidly by standard sparse matrix solvers. The matrices L and U of the LU decomposition will themselves be sparse. For problems involving certain types of excitations, only a part of the matrices L and U will be needed, and this can result in further savings in the storage required.

After reordering, the process 200 advances to a step 207 where the linear matrix problem is solved. The matrix problem to be solved is written as:

$$\hat{T}G = H$$

where the vector H represents the excitation and the vector G is the desired solution for composite sources. The excitation is the physical cause of the sound, temperature, electromagnetic waves, or whatever phenomenon is being computed. If the excitation is very distant (for example, as for a plane wave source), H will have a special form. If the vector H is placed vertically (as a column vector) alongside the matrix of FIG. 6, the bottom few elements of H alongside block 602, will be relatively large, and the remaining elements of H will be approximately equal to zero. The remaining elements of H are approximately zero because the composite testers separate the degrees of freedom according to how strongly they interact with a distant source.

When $\hat{T}$ is factored by LU decomposition, then:

$$\hat{T} = LU;$$

$$LUG = H;$$

and this is solved by the following two-step process;

| Step I: | Find X in | L X = H |
| Step II: | Find G in | U G = X |

The matrix L is a lower triangular matrix (meaning elements above its diagonal are zero). It follows immediately from this that if only the bottom few elements of H are non-zero, then only the bottom elements of X are non-zero. As a consequence, only the bottom right portion of L is needed to compute G. The remaining parts of L were used in computing this bottom right portion, but need not be kept throughout the entire process of computing the LU decomposition. This not only results in reduced storage, but also results in a faster computation for Step I above.

If only the far-field scattered by an object needs to be found, then further efficiencies are possible. In that case, it is only necessary to find the bottom elements of G, corresponding to the bottom non-zero elements of H. This can be done using only the bottom right portion of the upper triangular matrix U. This results in efficiencies similar to those obtained for L.

For other types of excitations, similar savings are also possible. For example, for many types of antennas, whether acoustic or electromagnetic, the excitation is localized within one active region, and the rest of the antenna acts as a passive scatterer. In that case, the active region can be arranged to be represented in the matrix of FIG. 6 as far down and as far to the right as possible. This provides efficiencies similar to those for the distant excitation.

A permutation of rows and a permutation of columns of the matrix T of FIG. 5 brings it to the matrix T^ of FIG. 6. These permutations are equivalent to an additional reordering of the unknowns. Thus, a solution or LU decomposition of the matrix T^ of FIG. 6 does not immediately provide a solution to the problem for the original data. Several additional steps are used. These steps involve: including the effects of two permutations of the unknowns; and also including the effect of the transformation from the original sources and testers to using the composite sources and composite testers.

Direct methods (such as LU decomposition) and iterative methods can both be used to solve the matrix equation herein. An iterative solution, with the compressed form of the matrix, can also be used with fewer computer operations than in the prior art. Many iterative methods require the calculation of the product of a matrix and a vector for each iteration. Since the compressed matrix has many zero elements (or elements which may be approximated by zero), this can be done more quickly using the compressed matrix. Thus, each iteration can be performed more quickly, and with less storage, than if the uncompressed matrix were used.

The compressed format of T^ has an additional advantage. In many cases, there is a way to substantially reduce the number of iterations required, resulting in further increases in speed. For example, in the method of conjugate gradients, the number of iterations required to achieve a given accuracy depends on the condition number of the matrix. (The condition number of a matrix is defined as its largest singular value divided by its smallest.) Physical problems have a length scale, and one interpretation of these composite sources and composite testers involves length scales. These composite sources and composite testers can be described in terms of a length scale based on a Fourier transform. This physical fact can be used to improve the condition number of the matrix and therefore also improve the speed of convergence of the iterative method.

A composite source is a function of spatial position, and its Fourier transform is a function of "spatial frequency." Composite sources that broadcast weakly tend to have a Fourier transform that is large when the absolute value of this spatial frequency is large. There is a correlation between how large this spatial frequency is and the smallness of the small singular values of the matrix. This correlation is used in the present invention to provide a method to achieve convergence in fewer iterations.

Two matrices, $P^R$ and $P^L$ are defined as right and left preconditioning matrices to the compressed matrix. Each column of the compressed matrix is associated with a composite source. This composite source can be found using a matrix algebra method, such as a rank-revealing factorization (e.g., singular value decomposition and the like). The rank-revealing factorization method provides some indication of the strength of the interaction between that composite source and other disturbances. For example, using a singular value decomposition, the associated singular value is proportional to this strength. The diagonal matrix $P^R$ is constructed by choosing each diagonal element according to the interaction strength for the corresponding composite source. The diagonal element can be chosen to be the inverse of the square root of that strength. Similarly, the diagonal matrix $P^L$ can be constructed by choosing each diagonal element according to the interaction strength for its associated composite tester. For example, the diagonal element can be chosen to be the inverse of the square root of that strength.

If the compressed matrix is called T, then the preconditioned matrix is $$P = P^L T P^R$$

The matrix P will often have a better (i.e., smaller) condition number than the matrix T. There are many iterative methods that will converge more rapidly when applied to the preconditioned matrix P rather than to T.

One embodiment of the composite source compression technique is used in connection with the computer program NEC2. This program was written at Lawrence Livermore National Laboratory during the 1970s and early 1980s. The NEC2 computer program itself and manuals describing its theory and use are freely available over the Internet. The following development assumes NEC2 is being used to calculate the electromagnetic fields on a body constructed as a wire grid.

NEC2 uses electric currents flowing on a grid of wires to model electromagnetic scattering and antenna problems. In its standard use, NEC2 generates an interaction matrix, herein called the Z matrix. The actual sources used are somewhat complicated. There is at least one source associated with each wire segment. However, there is overlap so that one source represents current flowing on more than one wire segment. NEC2 uses an array CURX to store values of the excitation of each source.

Figure 10A:
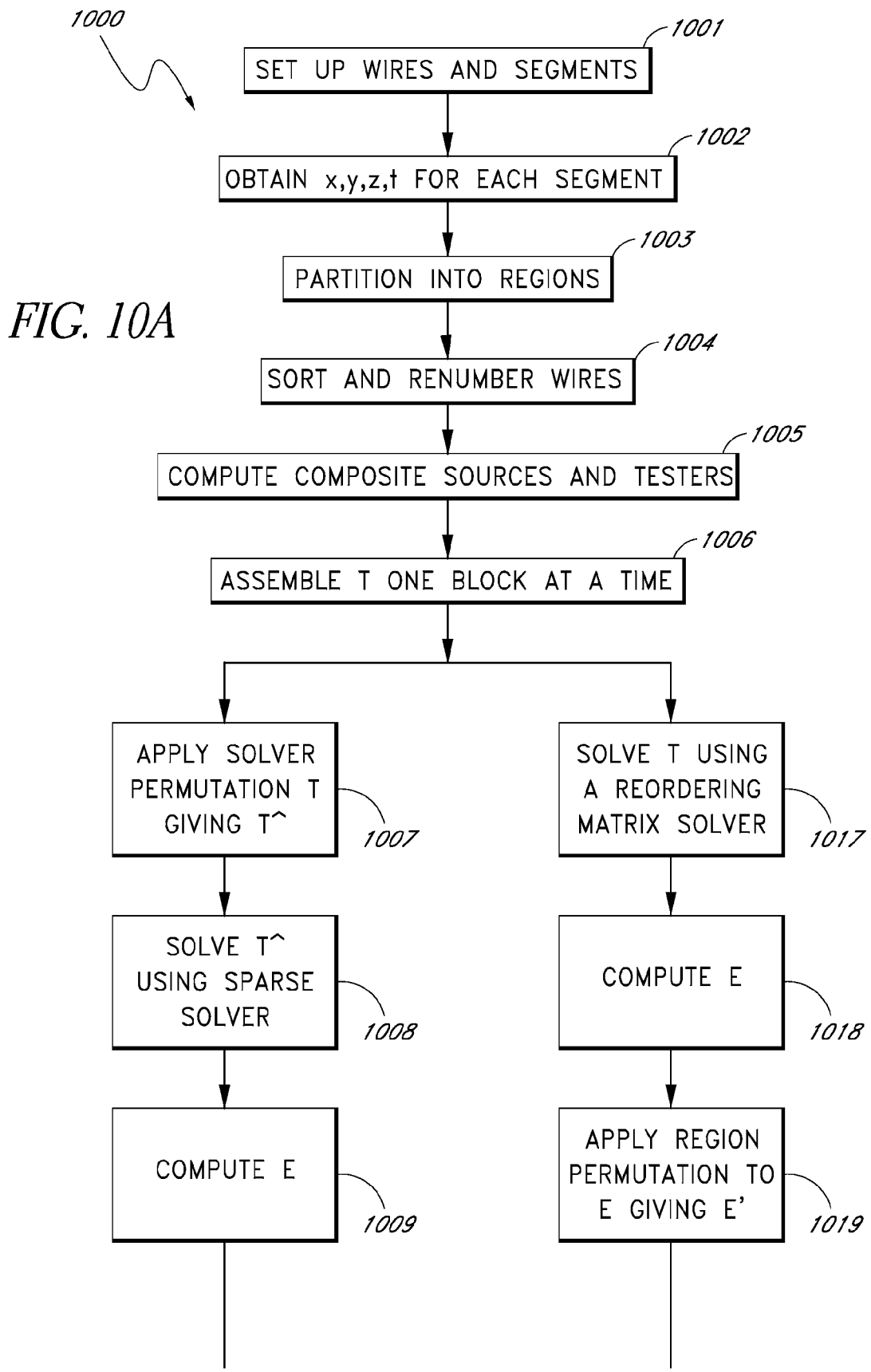
FIG. 10, consisting of FIGS. 10A and 10B, is a flowchart showing the process of generating a compressed (block sparse) impedance matrix in connection with a conventional moment-method computer program.

FIG. 10 is a flowchart 1000 showing the process of using NEC2 with composite sources and composite testers. The flowchart 1000 begins at a step 1001 where the NEC2 user begins, as usual, by setting up information on the grid of wires and wire segments. The process then advances to a step 1002 to obtain from NEC2 the number of wire segments, their locations (x,y,z coordinates), and a unit vector $\hat{t}$ for each segment. The vector $\hat{t}$ is tangent along the wire segment, in the direction of the electric current flow on the wire segment.

Next, in a step 1003, the wire grid is partitioned into numbered regions. A number of reference points are chosen. The reference points are roughly equally spaced over the volume occupied by the wire grid. Each wire segment is closest to one of these reference points, and the segment is considered to be in the region defined by the closest reference point. In one embodiment, the number of such points (and associated regions) is chosen as the integer closest to the square root of N (where N is the total number of segments). This is often an effective choice, although the optimum number of points (and associated regions) depends on many factors, and thus other values can also be used. For a set of N segments, each wire segment has an index, running from 1 to N.

After the step 1003, the process advances to a step 1004 where the wires are sorted by region number. After sorting, the numbering of the wires is different from the numbering used by NEC2. Mapping between the two numbering systems is stored in a permutation table that translates between these different indexes for the wire segments. Using this new numbering of segments, an array "a" is created, such that a(p) is the index of the last wire segment of the $p^{th}$ region (define a(0)=0 for convenience).

After renumbering, the process advances to a step 1005 where composite sources and composite testers for all regions are calculated. Source region p corresponds to unknowns a(p−1)+1 through a(p) in the ordering. Define M as M=a(p)−a(p−1). Choose M directions substantially equally spaced throughout three-dimensional space. In other words, place M roughly equally spaced points on a sphere, and then consider the M directions from the center of the sphere to each point. The order of the directions is unimportant. One convenient method for choosing these points is similar to choosing points on the earth. For example, choose the North and South poles as points. A number of latitudes are used for the rest of the points. For each chosen latitude, choose points equally spaced at a number of longitudes. This is done so that the distance along the earth between points along a latitude is approximately the same as the distance between the latitude lines holding the points. It is desirable that the points are equally spaced. However, even fairly large deviations from equal spacing are tolerable.

Now generate a matrix A of complex numbers with 2M rows and M columns. For m=1 to M and for n=1 to M, compute elements of this matrix two at a time: the element at row m and column n and also the element at row m+M and column n. To compute these two elements, first fill the NEC2 array CURX with zero in every position. Then, set position a(p−1)+n of CURX to unity. A value of unity indicates that only source number a(p−1)+n is excited. This source is associated with the wire segment of that number, even though it extends onto neighboring segments. The matrix Z is defined in terms of these same sources. Then, call the NEC2 subroutine CABC (CURX). The subroutine CABC generates a different representation of the source, but the same representation that the NEC2 subroutine FFLD uses. This representation is automatically stored within NEC2. The $m^{th}$ direction previously chosen can be described in spherical coordinates by the pair of numbers (Theta, Phi). After calculating Theta and Phi, the NEC2 subroutine FFLD(Theta,Phi, ETH,EPH) is called. Theta and Phi are inputs, as are the results from CABC. The outputs from FFLD are the complex numbers ETH and EPH. ETH and EPH are proportional to the strengths of the electric field in the far-field (far away from the source) in the theta and phi directions respectively. ETH is placed in row m and column n, (m,n), of A. EPH is placed at row m+M and column n of A. Alternatively, there are other ways to compute the numbers ETH and EPH produced by FFLD. For example, it will apparent to one of ordinary skill in the art that the subroutine FFLD can be modified to produce an answer more quickly by making use of the special form of the current, since most of the entries in the current are zero.

Next, a singular value decomposition of A is performed, such that:

$$A = UDV^h$$

where U and V are unitary matrices, and D is a diagonal matrix. The matrix U will not be used, so one can save on computer operations by not actually calculating U. The matrix V has M rows and M columns. Since these calculations were performed for the $p^{th}$ region, the square matrix $d_p^R$ is defined by $$d_p^R = V$$

The reason for this choice comes from the fact that $$AV = UD$$

and that each successive columns of the product UD tends to become smaller in magnitude. They become smaller because U is unitary and the singular values on the diagonal of D decrease going down the diagonal.

Figure 7:
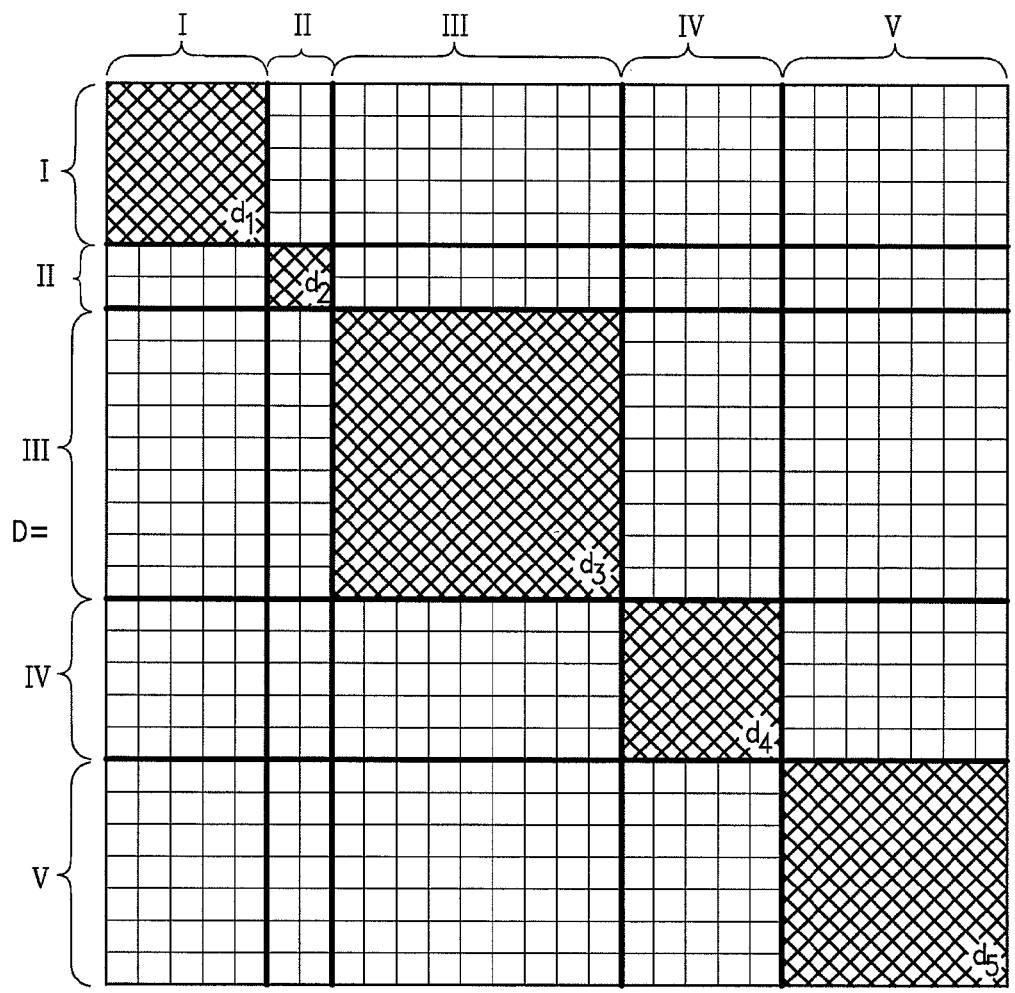
FIG. 7 illustrates the block diagonal matrix $D^R$.

Next, assemble an N by N block diagonal matrix $D^R$. That is, along the diagonal the first block corresponds to p=1. Starting at the bottom right corner of that block, attach the block for p=2, etc., as shown in FIG. 7.

Next a similar procedure is followed to find the block diagonal matrix $D^L$. For each region p, a matrix A is filled as before. However, this time this region is considered as receiving rather than as transmitting. Again A will have 2M rows and M columns, where M=a(p)−a(p−1). Again there are M directions, but now those are considered to be the receiving directions.

To understand what is to be put into A, it is instructive to note how the NEC2 computer program defines the interaction matrix Z. When used with wire grid models, the sources radiate electric and magnetic fields. However, it is the electric field reaching another segment that is used in NEC2. Each matrix element of Z is computed by computing the component of that electric field which is in the direction of the tangent to the wire segment.

For the pair of numbers (m,n), where m=1, . . . , M and n= 1, . . . , M, the matrix entries for A at (m,n) and (m+M,n) are calculated as follows. Compute a unit vector $\hat{k}$ in the $m^{th}$ direction. Find the unit vector tangent to segment number n, and call it $\hat{t}$. The position of the center of wire segment number n is found and is designated as the vector X. Then compute the vector $$\vec{f} = (\hat{t} - (\hat{k} \cdot \hat{t})\hat{k}) e^{j2\pi \hat{k} \cdot \overline{X}/\lambda}$$

where the wavelength is given by λ (NEC2 uses units where λ=1).

Note that the Green's function for this problem has a minus sign in the exponential, and the foregoing expression does not. This is because the direction of $\hat{k}$ is outward, which is opposite to the direction of propagation of the radiation.

For problems in electromagnetics, the physical wavelength λ is greater than zero. If a problem in electrostatics were being solved instead, electrostatics can be considered as the limit when the wavelength becomes arbitrarily large. The complex exponential above can then be replaced by unity. Also, for electrostatics, the relevant field quantity can be longitudinal (meaning f would be parallel to $\hat{k}$).

For this value of m (and associated direction $\hat{k}$), spherical coordinates define two directions called the theta and the phi directions. These directions are both perpendicular to the direction of $\hat{k}$. Compute the components of f in each of these directions, and designate them as fTheta and fPhi. These are complex numbers. Then place fTheta in row m and column n of A and place fPhi in row m+M and column n of A.

The matrix A is a matrix of complex numbers. Take the complex conjugate of A, (A*), and perform a singular value decomposition on it, such that:

$$A^* = UDV^h$$

Now define the left diagonal block for region p, $d_p^L$, as $$d_p^L = V^h$$

The superscript h on V, indicates Hermitian conjugate. The definition of the blocks for the right side did not have this Hermitian conjugate. From these diagonal blocks, assemble an N by N matrix $D^L$ in the same way as $D^R$ was assembled earlier. The motivation for these choices is partly that the matrix $DU^h$ has rows that tend to become smaller. Further, it is expected that the Green's function that was used in creating Z has properties similar to the far-field form used in creating $A^t$. The formula $$V^h A^t = DU^h$$

shows that $V^h A^t$ will also have successive rows that tend to become smaller. The choices described above suggest that successive rows of each block of the compressed matrix will also have that property.

It should be noted that the matrix A, whether used for the right side or for the left side, can be filled in other ways as well. For example, with an appropriate (consecutive in space) ordering of the angles, A can be made as an M by M matrix by using theta polarization (fTheta) values for one angle and phi polarization values (fPhi) for the next. Usually, it is desirable that A does not leave large gaps in angle for any component of the electric field, which is important far from the source or receiver.

Figure 8:
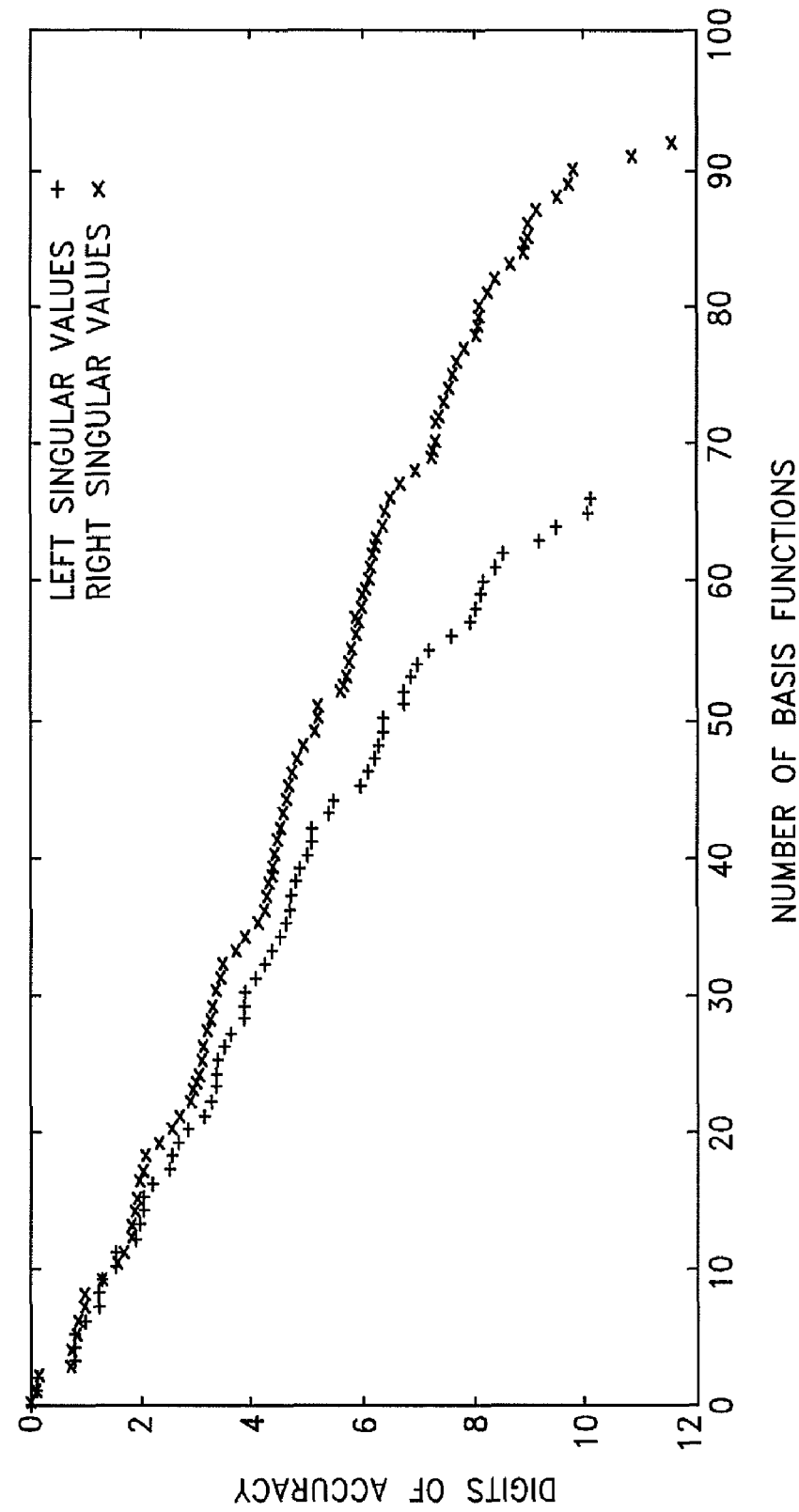
FIG. 8 is a plot showing the digits of accuracy obtained after truncating the basis functions for a block of the entire interaction matrix, with a block size of 67 by 93.
Figure 9:
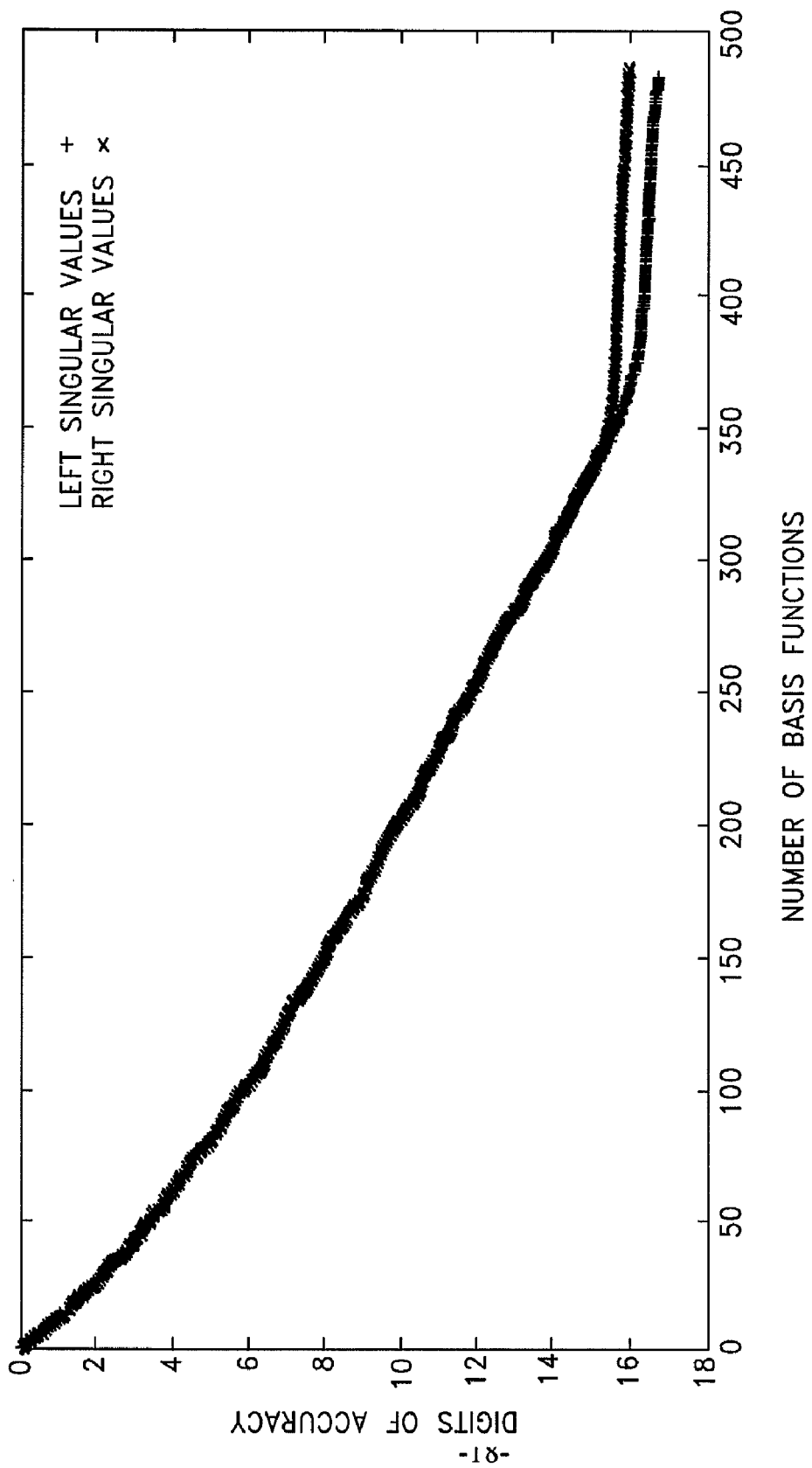
FIG. 9 is a plot showing the digits of accuracy obtained after truncating the basis functions for a block of the entire interaction matrix, with a block size of 483 by 487.

In performing the singular value decompositions for the right and left sides, singular values are found each time. FIGS. 8 and 9 show the singular values found for blocks of size 67 by 93 and 483 by 487, respectively. These calculations were done for a wire grid model with NEC2. The singular values are plotted in terms of how many orders of magnitude they are smaller than the largest singular value, and this is called "Digits of Accuracy" on the plots. FIGS. 8 and 9 show the accuracy that is achieved when truncating to a smaller number of composite sources or composite testers for regions that are relatively far apart. For regions that are closer together, the desired accuracy often requires the information from more composite sources and composite testers to be kept.

After computing composite sources and composite testers, the process advances to a step 1006 where a new matrix T, which uses the composite sources and testers associated with $D^L$ and $D^R$, is computed. The matrix is T given by the equation $$T = D^L Z D^R$$

T can be efficiently generated by using the numbering of the wire segments developed herein (rather than the numbering used in NEC2). The matrix Z is computed by NEC2 and renumbered to use the numbering described herein. Note that a block structure has been overlaid on Z and T. This block structure follows from the choice of regions. FIG. 4 shows one example of a block structure. Block $\{p,q\}$ of the matrix T, to be called $T\{p,q\}$, is the part of T for the rows in region number p and the columns in region number q. The formula for T given above is such that $T\{p,q\}$ only depends on $Z\{p,q\}$. Thus, only one block of Z at a time needs to be stored.

In the step 1006, T is assembled one block at a time. For each block of T, first obtain from NEC2 the corresponding block of Z. The wire segments within a block are numbered consecutively herein (NEC2 numbers them differently). Thus, first renumber Z using the renumber mapping from step 1004, and then perform the calculation:

$$T\{p,q\} = d_p^L Z\{p,q\} d_q^R$$

Many of the numbers in $T\{p,q\}$ will be relatively small. An appropriate rule based on a desired accuracy is used to choose which ones may be approximated by zero. The remaining non-zero numbers are stored. Storage associated with the zero-valued elements of $T\{p,q\}$ and of $Z\{p,q\}$ can be released before the next block is calculated. The top left portion of $T\{p,q\}$ has matrix elements which will be kept. Anticipating this, the calculation speed can be increased by not calculating either the right portion or the bottom portion of $T\{p,q\}$.

The matrix T is a sparse matrix, and it can be stored using an appropriate data structure for a sparse matrix. For a matrix with $N_z$ non-zero elements, an array $Z_z(i)$ for $i=1, \ldots, N_z$, can be used, where $Z_z(i)$ is the complex value of the $i^{th}$ matrix element. There are two integer valued arrays, $I_z(i)$ and $J_z(i)$ for $i=1, \ldots, N_z$. $I_z(i)$ gives the row number where the $i^{th}$ matrix element occurs in T and $J_z(i)$ its column number.

After calculation of T, the process proceeds to a process block 1007 where the rows and columns of the matrix T are reordered to produce a matrix T^. The matrix T is reordered into a matrix T^ so that the top left corner of every block of T^ ends up in the bottom right corner of the whole matrix. The T^ form is more amenable to LU factorization. FIG. 5 shows an example of a matrix T, and FIG. 6 shows an example of a matrix T^ after reordering. One embodiment uses a solver that has its own reordering algorithms thus negating the need for an explicit reordering from T to T^.

After reordering, the process advances to a step 1008 where the matrix T^ is passed to a sparse matrix solver, such as, for example, the computer program "Sparse," from the Electrical Engineering Department of University of California at Berkeley. The program Sparse can be used to factor the matrix T^ into a sparse LU decomposition.

NEC2 solves the equation $$J = Z^{-1} E$$

for various vectors E. In FIG. 10, the solution of the above matrix equation is done in steps 1009-1016 or, alternatively, in steps 1017-1023. The sequence of steps 1009-1016 is used with a matrix equation solver that does not provide reordering. The sequence of steps 1017-1023 is used with a matrix equation solver that does provide reordering.

In the step 1009, the vector E is computed by NEC2. Then, in the step 1010, the elements of E are permutated (using the same permutation as that used in the step 1004) to produce a vector E'. This permutation is called the region permutation. Next, in the step 1011, E' is expressed in terms of composite testers by multiplying E' by $D^L$, giving $D^L E'$. Then, in the step 1012, the same permutation used in the step 1007 is applied to $D^L E'$ to yield $(D^L E')^{\hat{}}$. (This permutation is called the solver permutation.) Then, in the step 1013, a matrix equation solver (such as, for example, the solver known as "SPARSE") is used to solve for the vector $Y^{\hat{}}$ from the equation $$T^{\hat{}}(Y^{\hat{}}) = (D^L E')^{\hat{}}$$

Then, in the step 1014, the inverse of the solver permutation is applied to $Y^{\hat{}}$ to yield Y. In the subsequent step 1015, J' is computed from the equation $$J' = D^R Y$$

In the subsequent, and final, step 1016, the inverse of the region permutation is applied to J' to yield the desired answer J.

Alternatively, the embodiment shown in steps 1017-1023 is conveniently used when the matrix equation solver provides its own reordering algorithms, thus eliminating the need to reorder from T to T^ (as is done in the step 1007 above). In the step 1017, a reordering matrix solver is used to solve the matrix T. In the subsequent step 1018, the vector E is computed by NEC2. Then, in the step 1019, the elements of E are permutated using the region permutation to produce a vector E'. Then, in the step 1020, $D^L E'$ is computed. The process then proceeds to the step 1021 where the equation $$TY = D^L E'$$

is solved for Y. After Y is computed, the process advances to the step 1022 where J' is calculated from the equation $$J' = D^R Y$$

Finally, in the step 1023, the inverse of the region permutation is applied to J' to yield the desired answer J.

Figure 11:
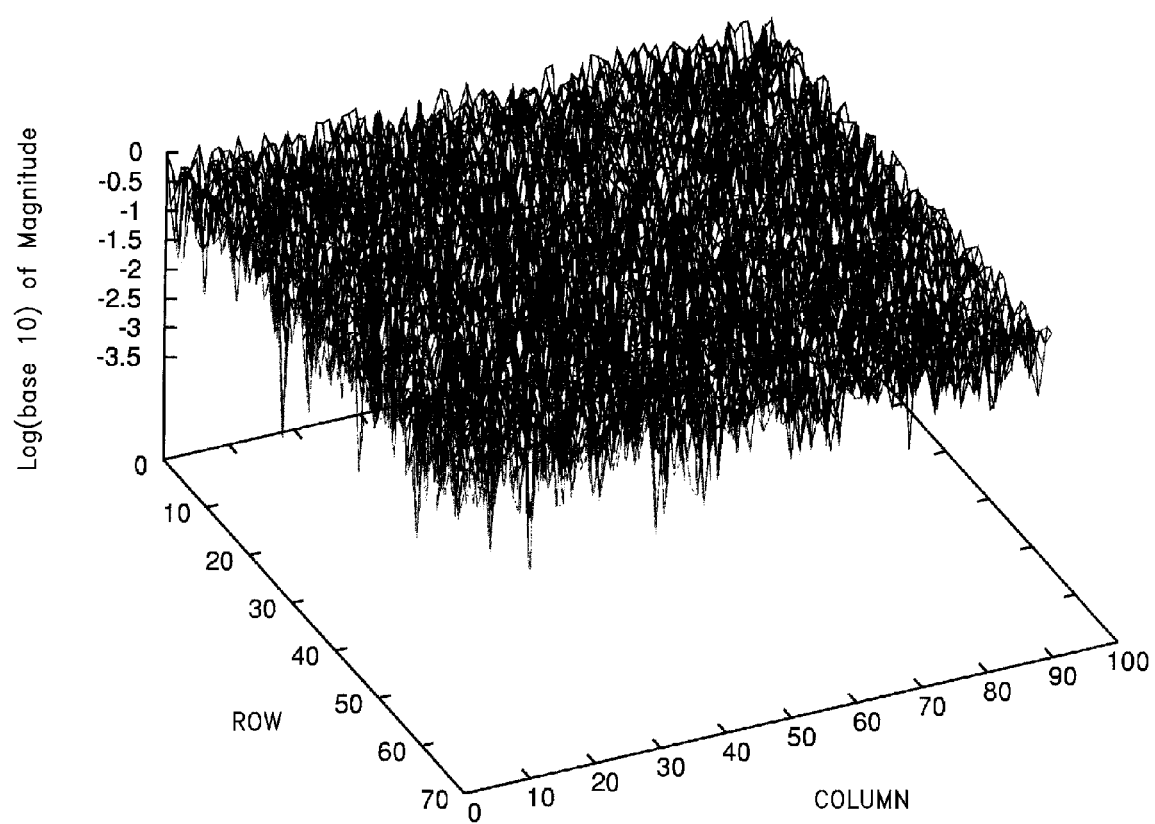
FIG. 11 is a three-dimensional plot showing magnitudes of the entries in a 67 by 93 element block of the interaction matrix (before transformation) for a wire grid model using the method of moments.
Figure 12:
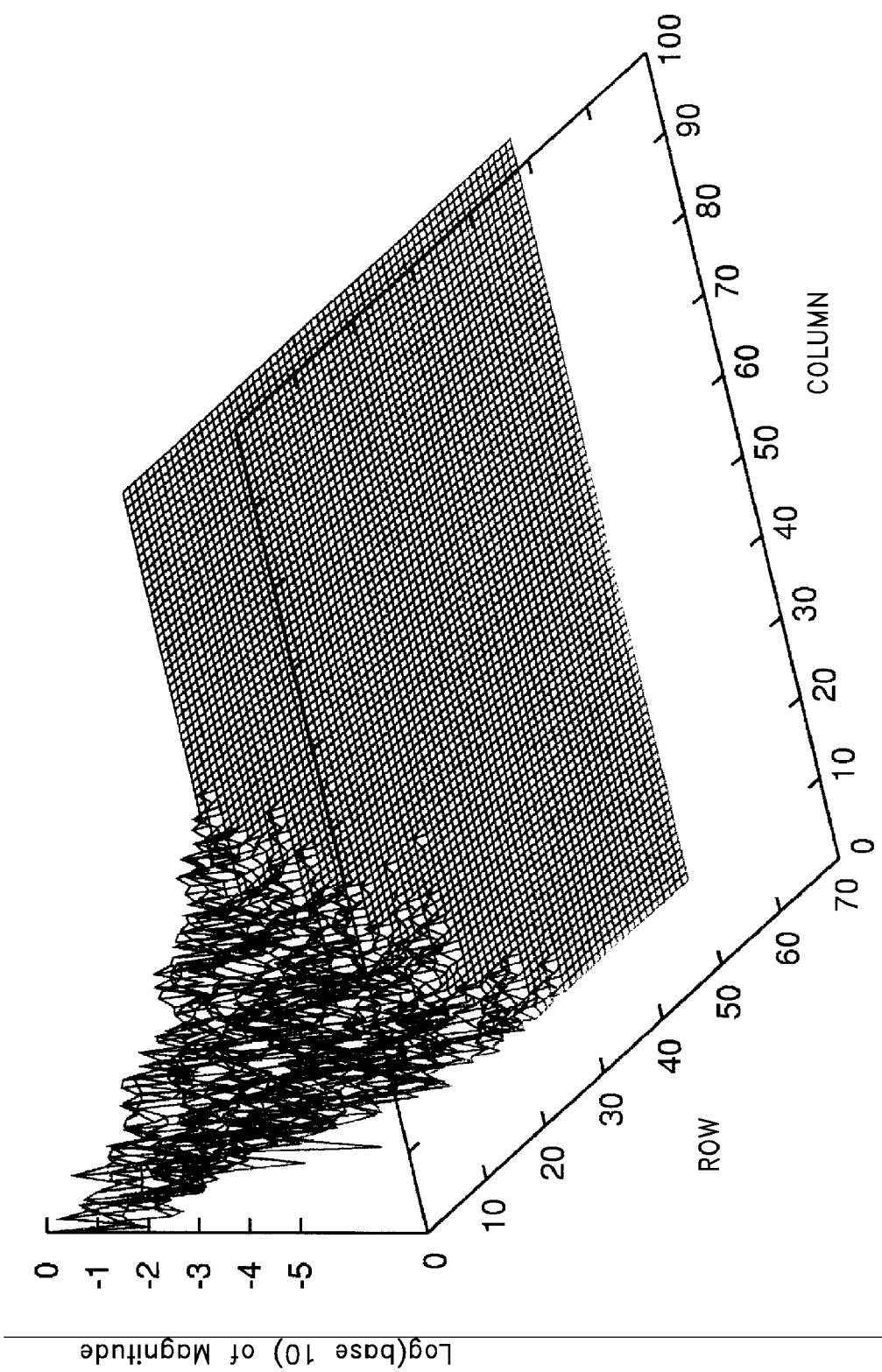
FIG. 12 is a three-dimensional plot showing magnitudes of the entries of the interaction matrix from FIG. 11 after transformation.

Many matrix elements are made small by this method. FIGS. 11 and 12 show before and after results for a problem using a wire grid model in NEC2, with a matrix Z of size 2022 by 2022 and a block of size 67 by 93. FIG. 11 shows the magnitudes of the matrix elements before changing the sources and testers, meaning it shows a 67 by 93 block of the renumbered Z. FIG. 12 shows this same block of T. The matrix T has a regular structure wherein the large elements are in the top left corner. This is a general property of the transformed matrix. For larger blocks, the relative number of small matrix elements is even better.

The algorithms expressed by the flowchart shown in FIG. 2 can be implemented in software and loaded into a computer memory attached to a computer processor to calculate, for example, propagation of energy, pressure, vibration, electric fields, magnetic fields, strong nuclear forces, weak nuclear forces, etc. Similarly, the algorithms expressed by the flowchart shown in FIG. 10 can be implemented in software and loaded into a computer memory attached to a computer processor to calculate, for example, electromagnetic radiation by an antenna, electromagnetic scattering, antenna properties, etc.

Many physical devices are designed and built using physical simulations, and many more will be designed and built using simulations in the future. Furthermore, many new devices have embedded processing that makes use of increasingly sophisticated algorithms. Some of these simulations involve only one type of physical characteristic and others involve the interaction of many physical characteristics or properties. Some of the more common physical properties involve electric fields, magnetic fields, heat transfer, mechanical properties, acoustics, vibration, fluid flow, particle fluxes, convection, conduction ablation, diffusion, electrical properties, gravity, light, infrared radiation, other radiation, electrical charge, magnetic charge, pressures, nuclear forces, and the like.

Figure 13:
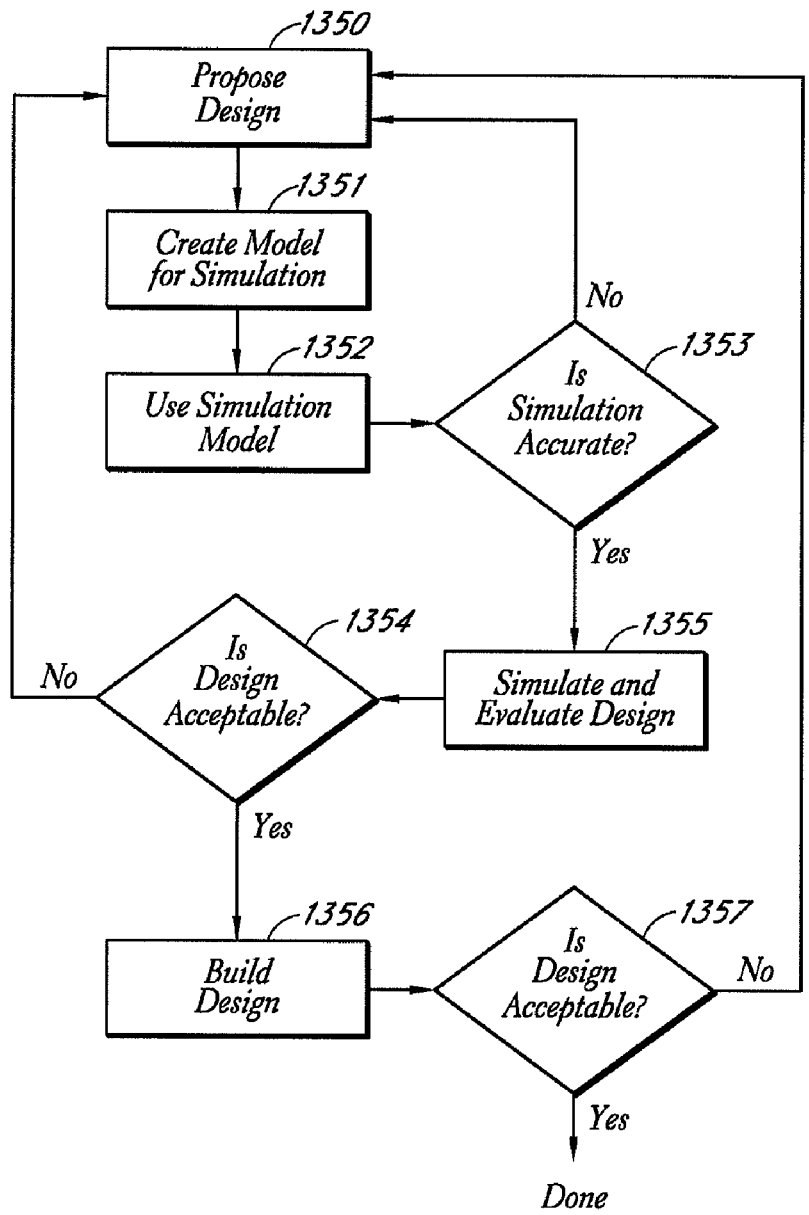
FIG. 13 shows use of the compression techniques in a design process.

FIG. 13 shows use of the above techniques in a design process. In a process block 1350 a design is proposed. The process then proceeds to a process block 1351 where a model is created for numerical simulation of the design. The simulation model is provided to a process block 1352 where the model is used in a numerical simulation using, at least in part, the data compression techniques and other techniques described above. The results of the simulation are provided to a decision block 1352 1353 where the accuracy of the simulation is assessed. If the simulation is not accurate, then the process returns to the process block 1350; otherwise, the process advances to a process block 1355 where further numerical simulation and analysis is done using, at least in part, the data compression techniques and other techniques described above. The simulation results are provided to a decision block 1354 where the design is evaluated. If the design is not acceptable, then the process returns to the process block 1350, otherwise, the process advances to a process block 1356 for building and testing of the design. The test results are provided to a decision block 1357 where the design is evaluated. If the design is not acceptable, then the process returns to the process block 1350, otherwise, the design process is finished.

Just as there are many physical properties or characteristics that may be simulated, there are also a large number of physical devices that may be simulated or that may have embedded simulations or other calculations or processing within them. For example, electromechanical systems are often simulated before they are built. These same systems often become a part of a device that itself has significant processing within it. Another example might be a modern aircraft. The aircraft itself will be designed using a large number of simulations for various aspects and components of the aircraft. The control system of the aircraft, its engines and so on may also involve significant computer processing in their functioning. For example, in many aircraft when the pilot commands a turn, often he really is providing input to a computer which then computes how the aircraft's various control surfaces are to be moved. Automobile engines now often use a computer and so do jet and other engines. Thus, many modern devices are either designed using computer based simulations or have computing power or simulations within them, or both.

Some of the physical devices that may be designed using a simulation of their physical properties are electromechanical devices, MEMS devices, semiconductors, integrated circuits, anisotropic materials, alloys, new states of matter, fluid mixtures, bubbles, ablative materials, and filters for liquids, for gases, and for other matter (e.g., small particles). Other physical devices may involve acoustics, convection, conduction of heat, diffusion, chemical reactions, and the like. Further devices may be used in creating, controlling or monitoring combustion, chemical reactions or power generation. Motors and generators are also often simulated during the design process, and they also may have computational processing within them.

Vehicles, including airborne, ground-borne, and seagoing vehicles may have their drag due to fluid flow simulated, and they may also have their vibration and structural properties simulated. Downward forces due to wind flow are also important for increasing traction for high performance vehicles and simulations are often used to design appropriate body shapes. Sound generated due to an open sun roof or an open window in a passenger car are further examples. The movement of fuel within fuel tanks is also a concern and may be simulated. The acoustic properties of submarines and of auditoriums are also often simulated. The strength and other properties of bridges when under loads due to weights on them, winds, and other factors are also subject to simulation.

Devices that cool electronic circuits, such as computer central processing units, may also be simulated. Parts of electronic circuits also may be designed using large scale simulations. This includes microwave filters, mixers, microstrip circuits and integrated circuits. It includes waveguides, transmission lines, coaxial cables and other cables. It also includes antennas. Antennas may transmit and receive, and in addition to electronic antennas, many other types of antennas (including, among other things, speakers that transmit sound) may also be simulated. This also includes antennas that receive (for example, it includes a microphone for sound). The design of electronic circuits, with or without the presence of electromagnetic interference, is an important field, as is the calculation of radar and sonar scattering.

The flow of fluids through jet and rocket engines, inlets, nozzles, thrust reversers compressors, pumps and water pipes and other channels may also be simulated. The dispersion of gasses, both beneficial and harmful through urban areas, oceans and the atmosphere are further examples. The aerodynamics of bullets and guns are yet another example.

Further examples are radomes and windows. A personal automobile may have windows that also act as radio antennas. These windows may be designed, using simulations of physical phenomena, so that certain frequencies of radiation pass through easily and others do not. This is one type of frequency selective surface. Such devices may also sometimes be subject to control through applied voltages or other inputs. Many devices also must be designed to be robust in the presence of electromagnetic interference. The source may be other nearby equipment or it may be a hostile source, such as a jammer or an electromagnetic pulse.

Large scale simulations are not limited to the physical properties of devices. For example, aspects of stocks, bonds, options and commodities may also be simulated. These aspects include risk and expected values. The behavior of Markov chains and processes (and of the matrices representing them) and of probabilistic events may be simulated. This is an old field, as the use of large matrices for large financial problems was discussed at least as far back as 1980, in the book *Accounting Models* by Michel J. Mepham from Heriot-Watt University, Edinburgh (Polytech Publishers LTD, Stockport, Great Britain). Econometric systems may be modeled using large simulations. See, for example, Gregory C. Chow and Sharon Bernstein Megdal, "The Control of Large- Scale Nonlinear Econometric Systems," IEEE Transactions on Automatic Control, Volume 23, April 1978. Some problems relate to investment strategies involve large scale computations that may be made more efficient using the methods of the present application. For example, see Thierry Post, "On the dual test for SSD efficiency with an application to momentum investment strategies," European Journal of Operational Research, 2006. Financial firms now routinely often employ Quantitative Analysts (often called Quants) to work on these simulations. Many of these simulations use coupled differential equations and/or integral equations. The methods of the present patent application may be used to improve the efficiency of simulations for all of these types of problems.

The methods disclosed in this application may be used to improve many existing computer simulations. These methods have a significant advantage over prior methods since these methods are relatively easy to implement in existing computer simulations. That is, one does not have to understand the details of an existing computer simulation to implement these methods. The main issue is that an array of disturbances is often needed from an existing simulation. However, this is relatively easy to produce from an existing simulation. These disturbances are generally already computed in the simulation, and it is only necessary to make them available. For example, this application describes an embodiment using the well known simulation program, the Numerical Electromagnetics Code (NEC). In that embodiment, NEC already had computer subroutines for computing the electric field due to an electric current on the body being simulated. Multiple calls to this subroutine computes the disturbances that then could be used for data compression, and to get an answer from NEC more efficiently.

Those skilled in the art know how to modify an existing computer simulation or calculation program to use the methods disclosed here. An advantage of the present invention is that the use of that simulation or calculation program is quite similar to its use before modification. As a result, someone who has used a simulation program may use the modified version for its intended purpose without further training, but can get a solution either faster, or on a smaller computer, or for a larger problem. Computer programs exist for designing all of, or an aspect of many physical devices. NEC has been used for over twenty years to design electromagnetic antennas. More powerful simulations are now available, and are used to design antennas, the electromagnetic scattering properties of vehicles used on land, water and air. There are many fluid flow computer programs available. One of the more popular is Fluent, which is sold by Ansys. Many electronic devices are designed using the various simulations sold by Ansoft and other companies. Also, Multiphysics software is now available for many problems, such as that produced by Comsol. These programs compute the coupled the interactions of many different physical effects. In each of these fields, it is well known how to design devices using this software. These devices are then often built based on these designs. Often, the software used to specify a design so that it may be built is coupled with the simulation software. Solving more difficult or larger problems is an important issue, and using the methods of the present application in these existing simulations (or in new simulation programs) makes this possible.

In some cases, simulations are used for more than to just design a device. Often, detailed design information is created. Sometimes this is then directly passed on to other automatic equipment that builds the device. This is commonly referred to as Computer Aided Design and Computer Aided Engineering. Sometimes the model that is used for simulation is also used for construction, while sometimes a related design is built or a related representation of the design is used for construction.

Many of these simulations involve approximating a continuous body using a grid or other discrete model. These models may then be used as a part of a computer simulation that computes some properties, such as physical properties. For those skilled in the art, it is well known how to create discrete or other models. There is readily available computer software that creates a variety of these models. These simulations are then used to design various physical devices and are also often used to aid in the construction of a device. For example, sometimes a design is passed on to equipment such as a lathe that accepts instructions in a numerical form.

Sometimes, when a desired device is approximated by a grid or other discrete model, the model does not faithfully represent the desired problem or device. When this occurs, it is often very time consuming for a person to find the reason why the model is a poor representation of the desired device. It is desirable to automatically find the problems with the model. Alternatively, even an automatic method that suggests where the problem might be would be very helpful. For example, if a computer simulation could have a module added that suggested where the model might have problems, this information might be used automatically or it might be output to a person, or both. For example, sometimes a simulation uses an automatic grid refinement, and automatically stops when further refinements produce little change in the result of the simulation. Sometimes it is up to the user to validate the result. A method for using a rank reduction or singular values to locate the exact location or an approximate likely location of the inaccuracy in the model would be very useful. It not only would have the advantage of allowing the simulation to be improved with little, if any, human intervention. Improving the model could have an additional advantage. An improved model could be used in construction of the device that is being simulated. This model might (optionally) even be used automatically for the construction.

Graphical Processing Units (GPUs) in computers have become very powerful by themselves. GPUs are typically controlled by a Central Processing Unit (CPU), and have two way communication with the CPU. GPUs have both processing power within them and also have a significant amount of storage. Some software is now using the GPU as a computing unit for functions other than just driving a display. For example, Part IV of the book, GPU Gems 2, edited by Matt Pharr (Addison Wesley, March 2005) discusses methods for using a GPU that way. Traditionally, the significant output of a GPU is electric currents and/or voltages that are used to drive the pixels of a display device. Now, there are even GPUs being developed only for computation, meaning that they do not even have the capability of driving a graphic display. Thus, it is important to generate algorithms that parallelize in a way that is compatible with the properties of GPUs. Such algorithms will have a tremendous speed advantage over algorithms that cannot be efficiently used in parallel this way. One advantage of the algorithms in the present patent application is that they naturally break a computational problem into small pieces, each involving matrix-matrix operations and/or matrix-vector operations. GPUs are designed so that naturally they may efficiently compute a large number of these operations in parallel. The algorithms of the present application naturally involve many operations of this type which may be done in parallel, since the result of one matrix operations is often not needed before performing a large number of other matrix operations.

The ability to perform matrix decompositions in parallel on a GPU follows from a property of algorithms such as LU factorization. For example, these algorithms may be performed one row at a time. Optionally, if they are performed from left to right on each row, it is possible to perform them in parallel on several rows at a time. It is only necessary that for any specific location on one row, the calculation has already been performed at least up to and including that location on all rows above. Thus, for example, if the calculation has been completed on the first n rows out to the m-th location, then one could compute the n+1-th row out to the m-th location. While the m-th location on the n+1-th row is being performed, one could calculate the n+2-th row out to the m−1-th location, and so on. This allows a computation to be performed in parallel. In the case where a block factorization is being performed, the GPU will run at an especially high speed, and the above discussion of locations may be applied to the locations of blocks, rather than to individual elements.

There are two different ways that an algorithm may be processed using blocks of a matrix. The first way may be called a partitioned algorithm, in which the operations of the elementary algorithm are all performed. However, by partitioning the matrix elements into blocks, one may perform all of the operations, albeit in a different order, to achieve the same result as for the elementary algorithm. This is called a partitioned algorithm. In the partitioned version, the pivots are still numbers, not sub-matrices. In other cases the algorithm is truly different from a partitioned algorithm and from the non blocked algorithm. For example, the LU factorization may be applied to the blocks or sub-matrices of a matrix and as a result one divides by pivots which are sub-matrices. We will call this algorithm a truly-blocked LU factorization.

As an example of the use of a faster simulation of electromagnetic effects, and how it may be used to design and build something, consider electromagnetic antennas on a ship. One may already have a ship that has been built and is in use. However, its need for antennas may change. It may be necessary to, among other things, build and install a new antenna. One possible way this may be done is by using a simulation of electromagnetics that makes use of methods described in this patent application. That simulation might be used to design the properties of the antenna when it is used in isolation. Alternatively, it might be used to simulate the properties of the antenna when it is used in its desired location. The presence of other antennas and other structures may modify the antennas performance. Then, the design might be modified by moving the antenna, moving other structures, or modifying the antennas shape or other structure. Then, the antenna might be installed and tested. Simulations might also be used to design a feed structure for the electromagnetic signals flowing into the antenna for transmission or flowing out of the antenna for reception. There are a large number of ways in which simulations may be used for design and also for building various devices. Some of the more common applications are for designing the radar scattering properties of ships, aircraft and other vehicles, for designing the coupled electrical and mechanical (including fluid flow) properties of MEMS devices, and for the heat and fluid flow properties of combustion chambers, and for using this information in then modifying existing devices or in building new devices.

Although the foregoing has been a description and illustration of specific embodiments of the invention, various modifications and changes can be made thereto by persons skilled in the art without departing from the scope and spirit of the invention. For example, in addition to electromagnetic fields, the techniques described above can also be used to compress interaction data for physical disturbances involving a heat flux, an electric field, a magnetic field, a vector potential, a pressure field, a sound wave, a particle flux, a weak nuclear force, a strong nuclear force, a gravity force, etc. The techniques described above can also be used for lattice gauge calculations, economic forecasting, state space reconstruction, and image processing (e.g., image formation for synthetic aperture radar, medical, or sonar images). Accordingly, the invention is limited only by the claims that follow.

What is claimed is:

1. A method of producing a description of at least one of a distribution of electric charge and an electric current comprising:

using software loaded into a computer memory attached to a computer processor and storing compressed data in said computer memory;

identifying groups of first basis functions, each of said first basis functions corresponding to an unknown in a system of equations, each of said unknowns corresponding to no more than one of said first basis functions, wherein for said groups of first basis functions the basis functions within any one of said groups of first basis functions are located relatively close to each other;

identifying groups of first testing functions, each of said first testing functions corresponding to a condition in said system of equations, each of said conditions corresponding to no more than one of said first testing functions, wherein for said groups of first testing functions the testing functions within any one of said groups of first testing functions are located relatively close to each other;

wherein each first basis function of a plurality of said first basis functions describes, at least in part, at least one of a distribution of electric charge and electric current and a plurality of said testing functions tests, at least in part, a tested electric field;

identifying an array of transmission data describing effects that are produced by a chosen group of said groups of first basis functions and are tested by a plurality of said first testing functions, said chosen group containing a plurality of said first basis functions;

identifying an array of reception data describing received affects that are received by a specific group of said groups of first testing functions and are produced by a plurality of said first basis functions, said specific group containing a plurality of said first testing functions;

using said transmission data and said reception data, producing a plurality of second basis functions containing no more basis functions than the number of first basis functions in said chosen group and a plurality of second testing functions containing no more testing functions than the number of first testing functions in said specific group, wherein using said reception data comprises reducing a rank of said reception data and wherein said plurality of second basis functions contains a plurality of second basis functions different from any of the basis functions in any of said identified groups of first basis functions and said plurality of second testing functions contains a plurality of second testing functions different from any of the testing functions in any of said identified groups of first testing functions;

on said computer processor using said plurality of second basis functions and said plurality of second testing functions to produce a compressed description of a portion of said system of equations, said a portion using said first basis functions in said chosen group and using said first testing functions in said specific group, said a portion including the part of said system of equations describing interactions between a plurality of said first testing functions in said specific group and said first basis functions in said chosen group, said compressed description being compressed relative to said a portion and said compressed description describing all of said a portion, wherein said a portion contains data that is not contained within said transmission data and said a portion contains data that is not contained within said reception data; and using, at least in part, said compressed description computing and storing a direct solution of said system of equations, said direct solution comprising said a description of at least one of a distribution of electric charge and an electric current.

2. The method of claim 1 wherein said reception data contains data that is not within said transmission data;
said transmission data contains data that is not within said reception data; and
said at least one of a distribution of electric charge and an electric current is due, at least in part, to said tested electric field.

3. The method of claim 2 wherein said compressed description comprises a description of an array of data containing elements that are zero and wherein said using said plurality of second basis functions comprises reducing a rank of said transmission data.

4. The method of claim 1 wherein the part of said system of equations corresponding to at least one basis function of said chosen group and at least one testing function of said specific group describes an interaction between a basis function and a testing function that are relatively close.

5. The method of claim 1 wherein said transmission data describes at least one effect at an angle of interest relative to at least one of said first basis functions in said chosen group and using said transmission data comprises reducing a rank of said transmission data.

6. The method of claim 5 wherein said reception data comprises far field data.

7. The method of claim 1 wherein said reception data comprises a Moment Method matrix and said transmission data comprises a Moment Method matrix.

8. The method of claim 1 wherein at least one of said plurality of second basis functions produces a weak effect in a region of space relative to said at least one of said plurality of second basis functions.

9. The method of claim 1 further comprising transforming a first matrix describing said system of equations into a second matrix by multiplying said first matrix on its right and its left by other matrices to produce said second matrix, said second matrix containing said compressed description.

10. The method of claim 1 further comprising:
using said a plurality of second basis functions to compress a second portion of said system of equations, said second portion not using any of said first testing functions in said specific group; and
using said a plurality of second testing functions to compress a third portion of said system of equations, said third portion not using any of said first basis functions in said chosen group.

11. The method of claim 1 wherein said groups of first basis functions do not overlap each other and said groups of first testing functions do not overlap each other.

12. A method of data compression, comprising:
using a computer program in a computer-readable medium attached to a computer processor, computing an effect involving at least one of an electric field, a magnetic field, a pressure and a particle flux, said effect produced at least in part by at least one of a distribution of electric charge, an electric current, an exciting pressure, and an exciting particle flux, said an effect described by a system of equations;

identifying an array of unknowns data describing effects produced by a plurality of n first basis functions, said plurality of n first basis functions corresponding to unknowns in said system of equations;

identifying an array of conditions data describing received affects tested by a plurality of m first testing functions, said plurality of m first testing functions corresponding to conditions in said system of equations;

reducing a rank of said array of unknowns data and using said array of conditions data producing a second plurality of n or less basis functions and a second plurality of m or less testing functions;

on said computer processor using said second plurality of n or less basis functions and using said second plurality of m or less testing functions, producing a sparse description of a portion of said system of equations, said portion using said plurality of n first basis functions and said plurality of m first testing functions, said sparse description being sparse relative to said portion and said second plurality of n or less basis functions contains a plurality of basis functions not in said n first basis functions and said second plurality of m or less testing functions contains a plurality of testing functions not in said m first testing functions, wherein said portion contains a plurality of data that is not contained within at least one of said array of unknowns data and said array of conditions data, said sparse description providing a sparse description of said plurality of data; and using, at least in part, said sparse description, computing and storing said an effect involving at least one of an electric field, a magnetic field, a pressure and a particle flux.

13. The method of claim 12 wherein said portion of said system of equations comprises all of said system of equations.

14. The method of claim 12 wherein said an array of unknown data describes effects produced by said plurality of n first basis functions at substantially all angular directions relative to said plurality of n first basis functions.

15. The method of claim 12 wherein using said array of conditions data comprises reducing a rank of said array of conditions data.

16. The method of claim 15 wherein at least one of said second plurality of testing functions is weakly affected by disturbances in a portion of space relative to said at least one of said second plurality of testing functions.

17. The method of claim 12 wherein said an array of conditions data describes at least one effect at an angle of interest relative to and received by at least one testing function in said plurality of m first testing functions.

18. The method of claim 12 wherein said an array of unknown data describes only effects consisting of far-field disturbances.

19. The method of claim 12 wherein said sparse description of a portion of said system of equations is a description containing elements that are zero.

20. The method of claim 12 wherein said array of conditions data contains data that is not within said array of unknowns data; and
said array of unknowns data contains data that is not within said array of conditions data.

21. A computer method of computing effects involving at least one of an electric field, a magnetic field, a pressure and a particle flux by using compression, said computer method comprising:

using a method loaded into software, said software loaded into a computer readable memory attached to a computer processor, said a method computing a compressed representation of an array of data describing said at least one of an electric field, a magnetic field, a pressure and a particle flux produced at least in part by sources comprising at least one of a distribution of electric charge, an electric current, an exciting pressure, and an exciting particle flux;

identifying an array of produced effects describing a plurality of effects produced by each of a plurality of first sources corresponding to sources used in said array of data;

identifying an array of tested effects describing a plurality of effects tested by each of a plurality of testers corresponding to a plurality of first testers used in said array of data;

using said computer processor to take linear combinations of data within said array of produced effects and to take linear combinations of data within said array of tested effects to produce said compressed representation of an array of data, said compressed representation of an array of data having a reduced rank compared to said an array of data, said taking linear combinations of data within said array of produced effects using at least one element of data within said array of produced effects that is not contained within said array of tested effects;

said at least one element of data describing an effect at an angular direction relative to one of said first sources; and using said compressed representation to compute and store a description of said effects involving at least one of an electric field, a magnetic field, a pressure and a particle flux.

22. The method of claim 21 further comprising using said compressed representation to compute a source comprising said at least one of a distribution of electric charge, an electric current, an exciting pressure, and an exciting particle flux.

23. The method of claim 22 wherein to compute a source comprises using said compressed representation to compute a direct solution comprising said a source.

24. The method of claim 21 wherein using said compressed representation to compute a description of said effects involving at least one of an electric field, a magnetic field, a pressure and a particle flux comprises computing a description of at least one of said a distribution of electric charge and said an electric current that, at least in part, excites said an electric field.

25. The method of claim 22 wherein said taking linear combinations of data within said array of produced effects comprises reducing a rank of said array of produced effects.

26. The method of claim 21 wherein said compressed representation describes at least one tested effect produced by a relatively close source.

27. The method of claim 21 wherein said to produce a compressed representation of said array of data uses at least one element within said array of tested effects not contained within said array of produced effects.

28. The method of claim 27 wherein said array of data contains a plurality of data that is not within said array of tested effects and is not within said array of produced effects and said compressed representation provides a relatively compressed representation of said plurality of data.

29. The method of claim 28 wherein said array of produced effects comprises a Moment Method matrix and said array of tested effects comprises a Moment Method matrix.

30. The method of claim 21 wherein said compressed representation comprises a representation describing at least one zero element.

31. The method of claim 21 further comprising compressing a matrix, wherein said array of data is contained within said matrix and said compressed portion is computed by multiplying said matrix on its right and left sides by matrices and said multiplying produces a compressed description of a part of said matrix not contained within said array of data.

32. The method of claim 21 wherein said array of produced effects contains produced effects for relatively all directions of interest relative to said plurality of first sources and said array of tested effects contains tested effects for relatively all directions of interest relative to said plurality of first testers.

* * * * *